(12) United States Patent
Aher et al.

(10) Patent No.: US 12,272,366 B2
(45) Date of Patent: Apr. 8, 2025

(54) SYSTEMS AND METHODS TO ALTER VOICE INTERACTIONS

(71) Applicant: Adeia Guides Inc., San Jose, CA (US)

(72) Inventors: Ankur Anil Aher, Maharashtra (IN); Jeffry Copps Robert Jose, Tamil Nadu (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/244,663

(22) Filed: Apr. 29, 2021

(65) Prior Publication Data

US 2022/0351741 A1    Nov. 3, 2022

(51) Int. Cl.
| | | |
|---|---|---|
| *G10L 21/003* | (2013.01) | |
| *G10L 15/00* | (2013.01) | |
| *G10L 21/04* | (2013.01) | |

(52) U.S. Cl.
CPC ............ *G10L 21/003* (2013.01); *G10L 15/00* (2013.01); *G10L 21/04* (2013.01)

(58) Field of Classification Search
CPC ........ G10L 21/003; G10L 15/00; G10L 21/04
USPC ......................................................... 704/200
See application file for complete search history.

(56) References Cited

U.S. PATENT DOCUMENTS

| | | | |
|---|---|---|---|
| 9,306,899 B1 | 4/2016 | Vendrow et al. | |
| 9,451,584 B1 | 9/2016 | Cosenza et al. | |
| 9,654,622 B1 | 5/2017 | Cohen et al. | |
| 9,678,637 B1 | 6/2017 | Brothers et al. | |
| 10,067,737 B1 * | 9/2018 | Ozery ..................... | H04R 3/005 |
| 10,229,437 B1 | 3/2019 | Fan et al. | |
| 10,891,959 B1 | 1/2021 | Moeller et al. | |
| 2003/0167167 A1 * | 9/2003 | Gong ....................... | G10L 15/22 |
| | | | 704/250 |
| 2012/0086568 A1 | 4/2012 | Scott et al. | |
| 2012/0179642 A1 * | 7/2012 | Sweeney ............. | G06F 16/3334 |
| | | | 706/55 |
| 2013/0183944 A1 | 7/2013 | Mozer et al. | |
| 2014/0236586 A1 | 8/2014 | Singh | |
| 2014/0236726 A1 | 8/2014 | Acosta et al. | |
| 2014/0282003 A1 * | 9/2014 | Gruber ..................... | G06F 3/167 |
| | | | 715/727 |
| 2015/0264292 A1 | 9/2015 | Greene et al. | |
| 2016/0094700 A1 | 3/2016 | Lee et al. | |

(Continued)

FOREIGN PATENT DOCUMENTS

EP    3599549 A1    1/2020

OTHER PUBLICATIONS

File history of U.S. Appl. No. 17/244,659.

(Continued)

*Primary Examiner* — Richemond Dorvil
*Assistant Examiner* — Rodrigo A Chavez
(74) *Attorney, Agent, or Firm* — Haley Guiliano LLP

(57) ABSTRACT

Systems and methods are disclosed for providing voice interactions based on user context. Data is received that causes a voice interaction to be generated for output at a user device during an output time interval. In response, current user contextual data of the user device is retrieved. The voice interaction and output time interval are altered to increase consumption likelihood of the voice interaction based on the current user contextual data. The altered voice interaction is outputted at the user device during the altered output time interval.

20 Claims, 12 Drawing Sheets

(56) References Cited

U.S. PATENT DOCUMENTS

| | | | |
|---|---|---|---|
| 2016/0112740 A1* | 4/2016 | Francisco | H04N 21/25883 725/12 |
| 2016/0140829 A1 | 5/2016 | Romanoff et al. | |
| 2016/0180658 A1 | 6/2016 | Degrassi | |
| 2016/0313868 A1 | 10/2016 | Weng et al. | |
| 2016/0334623 A1 | 11/2016 | Kishi | |
| 2017/0024777 A1* | 1/2017 | Rajwat | G06Q 30/0275 |
| 2017/0031575 A1 | 2/2017 | Dotan-Cohen et al. | |
| 2017/0102916 A1* | 4/2017 | Noble | G06F 3/013 |
| 2017/0133011 A1 | 5/2017 | Chen et al. | |
| 2017/0154629 A1 | 6/2017 | Lu et al. | |
| 2017/0171121 A1 | 6/2017 | Zhang et al. | |
| 2017/0221472 A1* | 8/2017 | Sharifi | G10L 13/08 |
| 2017/0257844 A1 | 9/2017 | Miller et al. | |
| 2017/0351328 A1 | 12/2017 | Perrin et al. | |
| 2018/0012509 A1 | 1/2018 | Rose | |
| 2018/0189267 A1* | 7/2018 | Takiel | G10L 15/19 |
| 2018/0219824 A1* | 8/2018 | Laller | G06F 9/451 |
| 2018/0329998 A1* | 11/2018 | Thomson | H04N 21/42203 |
| 2018/0336043 A1 | 11/2018 | Walkin et al. | |
| 2018/0358009 A1 | 12/2018 | Daley et al. | |
| 2019/0042556 A1* | 2/2019 | Anders | G06F 40/253 |
| 2019/0104119 A1 | 4/2019 | Giorgi et al. | |
| 2019/0109917 A1* | 4/2019 | Milanese | H04M 1/00 |
| 2019/0124388 A1 | 4/2019 | Schwartz | |
| 2019/0310631 A1 | 10/2019 | Naruse et al. | |
| 2019/0311718 A1* | 10/2019 | Huber | H04R 27/00 |
| 2019/0348043 A1 | 11/2019 | Saito et al. | |
| 2019/0361575 A1 | 11/2019 | Ni et al. | |
| 2020/0151121 A1 | 5/2020 | Shih et al. | |
| 2020/0304582 A1 | 9/2020 | Ohara | |
| 2021/0113921 A1 | 4/2021 | Musbah et al. | |
| 2021/0134265 A1 | 5/2021 | Rafferty et al. | |
| 2021/0287655 A1* | 9/2021 | Kawano | G10L 13/033 |
| 2022/0351712 A1 | 11/2022 | Aher et al. | |
| 2022/0351740 A1 | 11/2022 | Aher et al. | |

OTHER PUBLICATIONS

File history of U.S. Appl. No. 17/244,656.
PCT International Search Report for International Application No. PCT/US2021/063100, dated Mar. 22, 2022 (18 pages).
U.S. Appl. No. 17/244,659, filed Apr. 29, 2021, Ankur Anil Aher.
U.S. Appl. No. 17/244,656, filed Apr. 29, 2021, Ankur Anil Aher.

* cited by examiner

SYSTEMS AND METHODS TO ALTER VOICE INTERACTIONS

BACKGROUND

The present disclosure is directed to providing voice interactions. In particular, techniques are disclosed for altering voice interactions based on user context.

SUMMARY

Users can receive voice notifications via many different user devices (e.g., mobile phones, smart home hubs, etc.). Voice notifications, and voice interactions in general, provide a convenient and useful mode for content consumption to users. Conventional voice notification systems typically provide users with an audio signal synthesized from text (e.g., using a text-to-speech generator) or from user speech. These conventional voice notification systems fail to consider a user's context when providing voice notifications.

Users may perceive voice interactions to be useful in some circumstances and to be a disturbance in other circumstances. Voice interactions (e.g., voice output, audio notifications, audio output of search results, etc.) may be missed by a user due to several factors, including, but not limited to, the user's environment, the noise level, the user's attention, the user's state of mind, etc. Providing voice interactions at an inappropriate time may also disturb and/or irritate the user (e.g., while a user is unavailable). For example, a user may be participating on a video conference call and would find a long voice notification about a recent email to be disruptive. As another example, a user may be listening to music using headphones and would feel disturbed if a loud voice alert suddenly interrupted their music. Consequently, voice interactions may not be easily consumed and/or may be missed entirely when provided using conventional voice notification systems, leaving users frustrated and worsening the users' consumption experience. Further, conventional voice notification systems may require repeated presentation of the same voice notification until the user can consume it fully. Thus, conventional voice notification systems may additionally waste system resources.

To overcome these problems, systems and methods are disclosed herein for providing voice interactions based on user context. In some aspects of the present disclosure, the systems and methods provide for a voice interaction engine for altering voice interactions to be suitable for consumption based on user context. Data is received that causes a voice interaction to be generated. In response to receiving the data, user contextual data is retrieved. One or more characteristics of the voice interaction may be altered based on user contextual data. For example, a voice interaction engine may alter an output time and/or an output duration of the voice interaction. In some embodiments, a voice interaction engine directly generates a voice interaction based on a user's context. In some embodiments, a user availability level for consuming the voice interaction is determined based on the user contextual data, and the voice interaction is altered based on the user availability level. In some embodiments, altering the voice interaction includes altering content of the voice interaction (e.g., to be suitable for consumption at the user availability level).

Voice interactions may be generated due to various reasons and/or in order to perform different functions. In some embodiments, a voice interaction engine receives the data that causes a voice interaction to be generated. Examples of data that causes the voice interaction may include, but are not limited to, an instruction to generate a voice interaction, content to be presented as a voice interaction, a voice interaction such as a user command, etc. The voice interaction may be intended for output at a user device or a plurality of devices. For example, a voice notification may be generated for output at a smart hub device and a smartphone due to receiving an indication that new content is available. For example, the voice interaction engine may receive a voice search query via a first device and causes the results of the query to be outputted as a voice interaction via a second device where the user is currently active.

User devices typically collect user contextual data that may indicate a user's circumstances including user activity, device usage history, weather data, location data, user preferences, etc. In some embodiments, the voice interaction engine retrieves user contextual data of a user device in response to receiving the data causing the voice interaction. For example, the voice interaction engine may access current device usage and environment data at the smart hub device to determine if the user's current environment is noisy and crowded or if the user is actively focused on a content item. The voice interaction engine may then determine a suitable option for altering the voice interaction based on the user contextual data.

As part of determining a suitable option, a user's availability and interest for consuming a voice interaction may be determined using several factors from the user contextual data. In some embodiments, the voice interaction engine determines, based on the user contextual data, a user availability level for content consumption. Examples of user availability level may include, but are not limited to, an availability state (busy/not busy), a degree of availability (e.g., 60% available), an attention level (e.g., moderately attentive), content consumption acceptance, etc. For example, the voice interaction engine, based on the user being in a calm environment, may determine a moderate consumption acceptance level that indicates the user can consume a voice message with a duration up to ten seconds. In another example, the voice interaction engine, based on the user being in a noisy environment, may determine that the user would easily miss a brief voice alert (e.g., a sharp beep noise or a short voice message such as "You have mail").

The voice interaction engine may then alter the voice interaction based on the user availability level. For example, if the user may only consume up to ten seconds of a voice message, the voice interaction engine may alter the voice message to provide key parts of the voice message or to convey the intent of the voice message within ten seconds. In some embodiments, the voice interaction engine alters the content of the voice interaction to be suitable for consumption based on the user context (i.e., at the determined user availability level). For example, a voice message may be "Harry Potter is now on Channel 2." The voice interaction engine may summarize the voice message by shortening the content (e.g., "Potter on 2"). For example, a voice message may be "Drink a bottle of Red Bull and recharge yourself." If the user availability level indicates that the user has a very high consumption acceptance, the voice interaction engine may expand the voice message content to be suitable for the user availability level. For example, a voice message may be altered to say "Hey! Drink Red Bull! It gives you wings!"

In some embodiments, the voice interaction engine may determine a product identifier from the voice interaction content. The voice interaction engine may retrieve content related to the product identifier and alter the voice interaction to include the retrieved content. For example, a voice message may be altered to say "Hey! Drink Red Bull! Recharge with the Red Bull commercial!" and include a playback of a Red Bull commercial. For example, the voice message may be combined with audio content related to the product identifier. For example, the voice message is altered to include "Recharge with the Red Bull theme song!" along with a playback of a Red Bull theme song.

The altered voice interaction may be provided as output of a device. In some embodiments, the voice interaction engine causes output of an altered voice interaction at a user device. For example, the voice interaction engine may cause a smart home hub (e.g., Amazon Echo) to play back the expanded voice message (e.g., "Hey! Drink Red Bull! Recharge with the Red Bull commercial!" along with a Red Bull commercial). In some embodiments, the mode of delivery is altered as part of altering the voice interaction. For example, the voice interaction engine may cause playback of video content on a display as part of providing the altered voice interaction. In some embodiments, a voice interaction is intended for output during a particular output time interval. For example, a reminder created due to a voice query may be generated and scheduled for output at a smart hub device during a five-minute window in the afternoon.

A voice interaction may be altered to improve consumption probability for a voice interaction according to the user contextual data. In some embodiments, the voice interaction engine retrieves user contextual data of the user device and, based on the user contextual data, determines the probability that a user can consume the voice interaction. For example, the voice interaction engine may determine that the user is unlikely to consume a voice message that lacks personalization (e.g., a low consumption likelihood for "Time for your flight!"). For example, the voice interaction engine may determine that the user is unlikely to consume an audio message of search results if outputted during the climax of a movie that the user is watching. In some embodiments, the voice interaction engine alters the voice interaction and output time interval to improve consumption likelihood to improve consumption likelihood based on the user contextual data. For example, the voice interaction engine may personalize a voice message by calling out to the user (e.g., "Hey Jon, time for your flight!"). For example, the voice interaction engine may delay the output time interval until the movie's credits are presented to the user. In some embodiments, the voice interaction engine causes output of an altered voice interaction at a user device during an altered output time interval.

A particular sound may be identified from the user contextual data that may be beneficial for altering the voice interaction. In some embodiments, a voice interaction engine detects an utterance from the user contextual data (e.g., a repeated syllable such as "Ah" that is present in an environment around a user device). The voice interaction engine may determine a first audio characteristic for the utterance and alter one or more audio characteristics of the voice interaction based on the first audio characteristic. In some embodiments, the voice interaction engine alters the voice interaction to overlap with the utterance. The altered voice interaction is then provided to a user (e.g., via wireless headphones a user is currently using). For example, a user may be listening to audio content via Bluetooth headphones. A voice interaction engine may identify a portion of the audio content (e.g., a laugh track or repetitive music) and determine to provide the voice interaction over the identified portion. In this example, the voice interaction alters the voice interaction to overcome the first audio characteristic to enable a user to perceive the voice interaction, for example, by adjusting a frequency, pitch, tone, etc., of the voice interaction to supersede the laugh track.

In some aspects of the present disclosure, the described techniques or any combination thereof improve upon conventional systems by, for example, enabling a voice interaction engine to alter voice interactions to suit a user's current circumstances rather than merely present a voice interaction in an unsuitable manner and potentially spoil the user's consumption experience. In some aspects, a voice interaction engine alters the voice interaction based on a user's context to present the voice interaction in a manner that improves the user's consumption experience. For example, if a user is participating on a video conference call, a voice interaction engine may summarize a long voice notification for presenting such that the voice notification does not disrupt the user's video conference call. For example, if a user is listening to music, a voice interaction engine may alter audio characteristics of a voice interaction for presenting during a particular portion in the playback of the music such that the voice interaction is perceivable while overlapping with the user's music. In some aspects of the present disclosure, the voice interaction engine reduces wasted system resources by altering a voice interaction to be more easily consumed, thus aiding a user to fully consume the voice interaction in a single presentation and preventing repeated generation and presentation of the same voice interaction. In the various aspects of the present disclosure, a voice interaction engine provides voice interactions that are less disturbing, less frustrating, and more easily consumed, thereby improving the utility, convenience, and benefits of voice interaction systems and overall enhancing the user's consumption experience.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for altering voice interactions based on user context.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof.

As referred to herein, the term "voice interaction" should be understood to mean an interaction between two or more entities that comprises an audio component (e.g., speech or a short beep) intended as part of a communication. Some non-limiting examples of voice interactions include voice output, audio notifications, audio output of search results, etc. Voice interactions may be provided alone or in combination with any other content.

Figure 1:
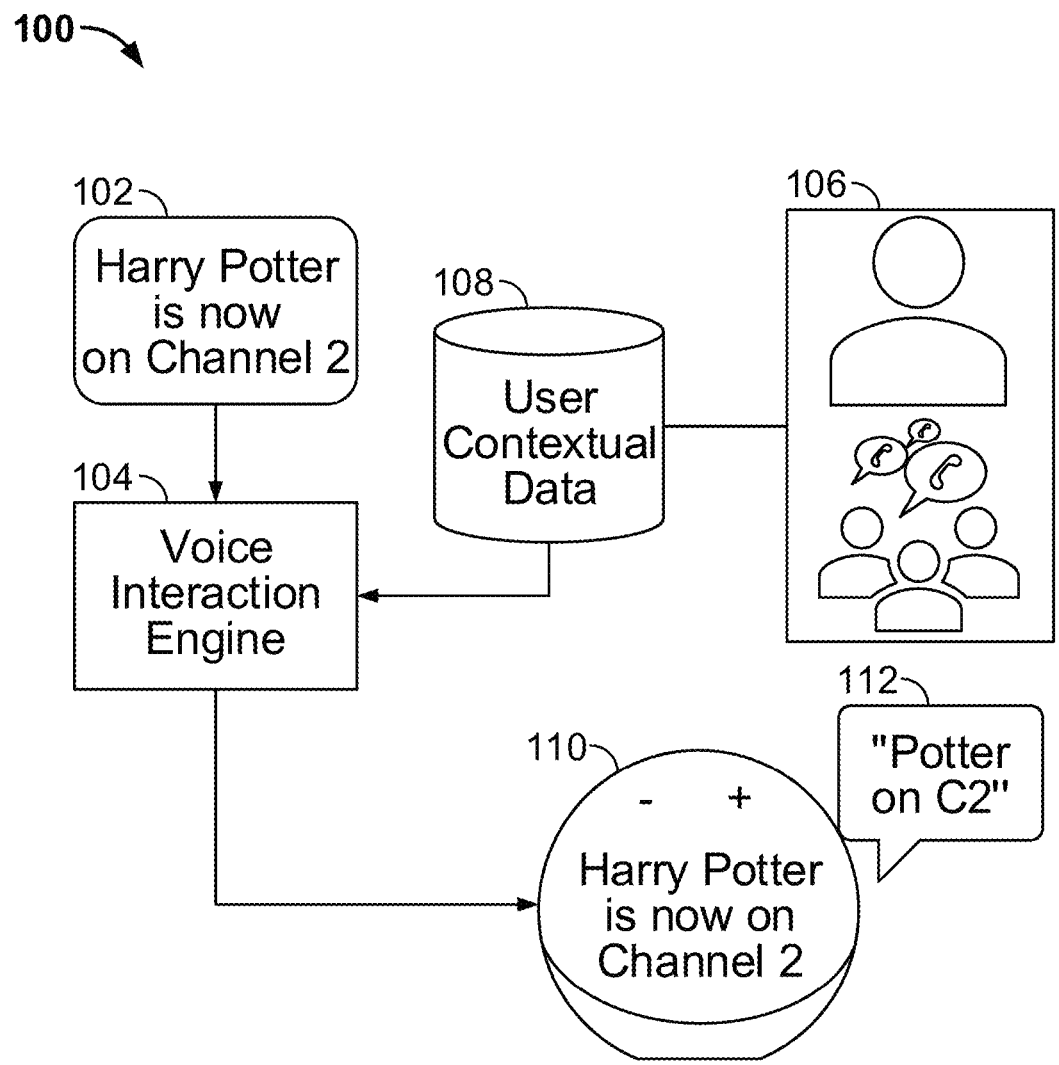
FIG. 1 shows an exemplary scenario in which content of a voice interaction is summarized based on user contextual data, in accordance with some embodiments of the disclosure.

FIG. 1 shows an exemplary scenario in which system 100 summarizes content of a voice interaction based on user contextual data, in accordance with some embodiments of the disclosure. System 100 may include voice interaction engine 104 and device 110. In some embodiments, system 100 may be part of a voice interaction application for generating voice interactions. The voice interaction application may be hosted on a user device and/or a remote server connected to one or more user devices. For example, system 100 may be part of an automated digital assistant framework, where functions of system 100 are fully or partially performed at a smart hub device or at a plurality of interconnected smart devices. In another example, system 100 may be part of a notification architecture implemented in a global notification service. Voice interaction engine 104 receives data 102 that causes a voice interaction to be generated (e.g., an alert that states "Harry Potter is now on Channel 2"). Examples of data 102 that may result in a voice interaction include search queries, voice interactions, alerts, push notifications, conditional trigger data, an instruction from a device for generating a voice interaction, etc.

Voice interaction engine 104 retrieves user contextual data 108, which indicates a user's circumstances as depicted at user context 106. For example, a user may be in a noisy environment as shown at user context 106, and user contextual data 108 may contain environment audio data indicating a high level of background noise from the noisy environment. Voice interaction engine 104 may retrieve user contextual data 108 in response to receiving data 102. In some embodiments, voice interaction engine 104 accesses a user device associated with the user depicted in user context 106 to retrieve user contextual data 108. Additionally or alternatively, voice interaction engine 104 may cause the user device for a user depicted in user context 106 to collect current user contextual data to be provided as user contextual data 108.

User contextual data may be collected and identified through various data acquisition systems and techniques. Some examples of user contextual data 108 may include biometric measurements, environment data, audio data, device activity, user activity, user profiles, user preferences, content consumption activity, content consumption history, etc., and any combinations thereof. Voice interaction engine 104 may gather user contextual data 108 directly and/or using devices around the user. For example, voice interaction engine 104 may access current activity data of a user device and capture current environment data around the user device by activating a sensor for the capture. The sensor may be an internal component of the user device or an external component connected to the user device. The sensor may be directly part of or connected to voice interaction engine 104. Voice interaction engine 104 may cause any combination of internal and/or external sensors to be activated for collecting user contextual data 108 (e.g., for one or more devices). As another non-limiting example, voice interaction engine 104 generates and transmits an instruction to collect device and environment data in the vicinity of the user such as around the user's device. In response to the instruction, the user's device retrieves device usage data (e.g., from the device's memory) and activates one or more sensors for gathering user and environment data. The sensors may include but are not limited to, a microphone, altimeter, accelerometer, magnetometer, pedometer, gyroscope, GPS locator, heart rate sensor, air humidity sensor, barometer, ambient sensors, etc. For example, the user's device may collect an ambient temperature using a thermometer, movements using an accelerometer, an image of the user's surroundings using a camera, and background audio using the microphone. The user's device may then provide the temperature, movements, image, and audio, among other collected data, as user contextual data 108 to voice interaction engine 104 to be used for altering a voice interaction.

The data acquisition systems and techniques may be selected depending on the relevance and practicality in collecting the pertinent data to be part of user contextual data 108. In some embodiments, voice interaction engine 104 identifies which devices, sensors, and/or combination thereof that can provide suitable data for user contextual data 108 to represent the user's circumstances. Voice interaction engine 104 may identify and select which devices and/or sensors based on various factors including past and present activity, proximity to the user, capability, performance, etc. For example, voice interaction engine 104 may identify the nearest sensor to the user such as a thermometer for ambient and/or body temperature on a smart watch worn by the user. Voice interaction engine 104 may also identify a frequently used device such as a tablet device stores and collects suitable activity and environment data. Once identified, voice interaction engine 104 may determine if the devices have stored sufficient data (e.g., in memory of the device). Voice interaction engine 104 may also cause the devices to collect additional data as appropriate. Once sufficient data is available, voice interaction engine 104 causes the devices to provide the data as user contextual data 108.

Voice interaction engine 104 may then determine a user availability level based on user contextual data 108. In some embodiments, voice interaction engine 104 may perform one or more analytical techniques on user contextual data 108 to determine how to alter the voice interaction. For example, voice interaction engine 104 may execute a heuristics analysis algorithm (e.g., using a heuristics analyzer) to examine different aspects of user contextual data 108 that may be relevant for altering a voice interaction generated due to receiving data 102. Voice interaction engine 104 may determine various factors from the heuristics analysis of the user contextual data that impact the user availability level (e.g., user engagement and surrounding conditions). For example, voice interaction engine 104 may determine a low user availability level for the user since the user is engaged on a group call based on user contextual data 108 of user context 106. In another example, voice interaction engine 104 determines that the user may have a short attention period for consuming content since the user device is in a noisy environment as indicated by user contextual data 108. In a third example, voice interaction engine 104 may determine a low user availability level since the user is in a crowded environment by performing image processing and analysis on a captured image of the surroundings and detecting several other people near to the user. Based on the user availability level, voice interaction engine 104 alters the voice interaction content.

Voice interaction 112 is outputted at device 110. In some embodiments, voice interaction engine 104 causes device 110 to generate voice interaction 112 for output based on the altered voice interaction content. For example, voice interaction engine 104 may have extracted and altered textual data from data 102 for summarizing the voice interaction content. Voice interaction engine 104 may transmit the altered textual data to device 110 along with an instruction that causes device 110 to generate a voice interaction based on the altered textual data. In some embodiments, device 110 may present additional content related to voice interaction 112. For example, the original message from data 102 may be displayed. In another example, voice interaction engine 104 may provide video content and/or audio content to be presented at device 110 along with voice interaction 112. In this example, voice interaction engine 104 may provide an audio preview related to a movie with "Harry Potter" in the title being presented on Channel 2 for device 110 to output as part of voice interaction 112. In addition, voice interaction engine 104 may cause device 110 to display a video preview related to the movie being presented on Channel 2 while outputting voice interaction 112.

Figure 2:
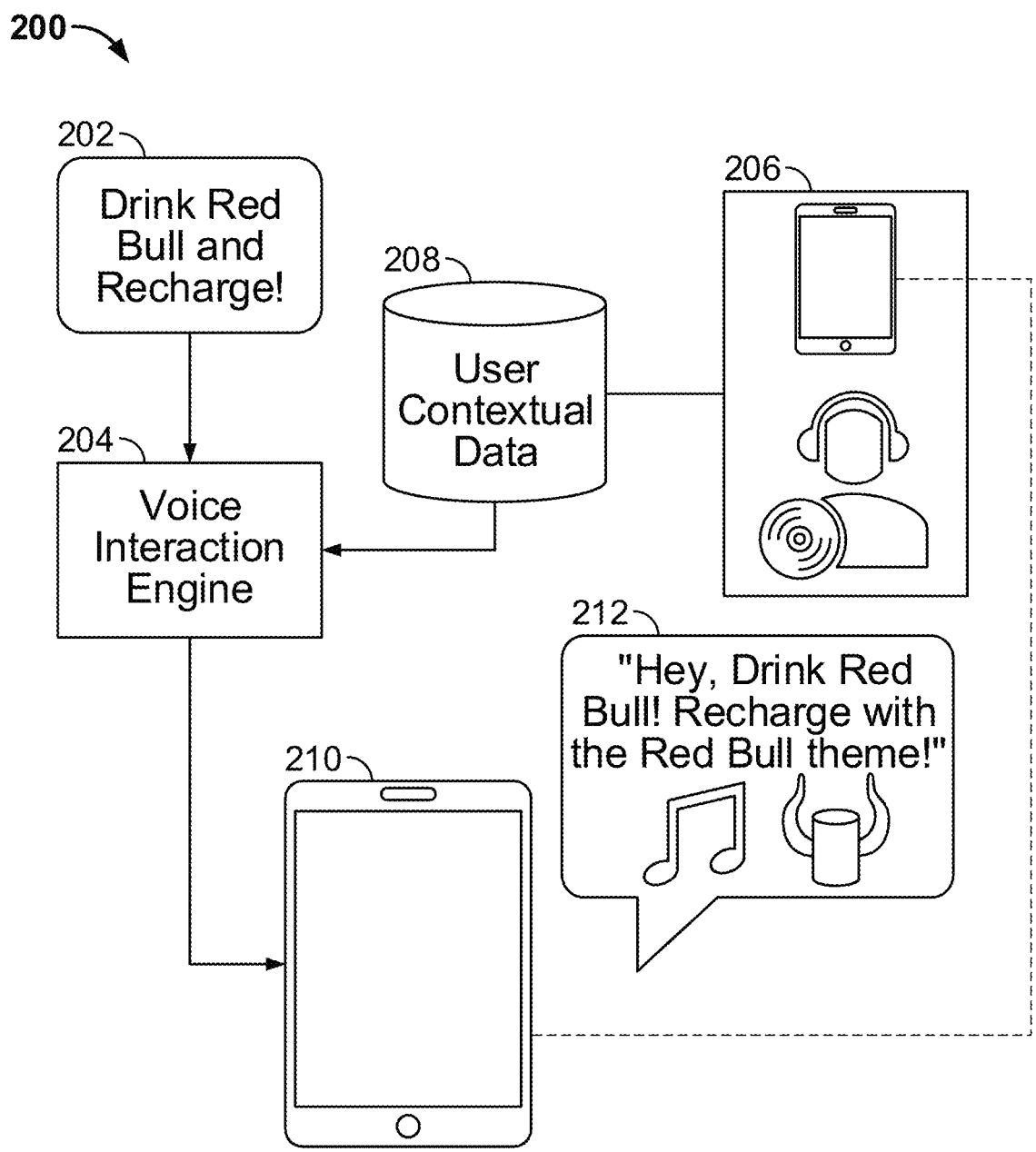
FIG. 2 shows an exemplary scenario in which content of a voice interaction is expanded based on user contextual data, in accordance with some embodiments of the disclosure.

FIG. 2 shows an exemplary scenario in which system 200 expands content of a voice interaction based on user contextual data, in accordance with some embodiments of the disclosure. System 200 may include voice interaction engine 204 and user device 210. For example, voice interaction engine 204 may be a part of a background process for providing voice interactions on user device 210. Voice interaction engine 204 receives data 202 that causes a voice interaction to be generated. For example, data 202 may include a signal to provide a voice interaction based on content contained in data 202 (e.g., a message that states, "Drink Red Bull and Recharge!"). In response to receiving data 202, voice interaction engine 204 retrieves user contextual data 208. User contextual data 208 may include any information that indicates a user's circumstances as depicted in user context 206. For example, user context 206 may depict the user is currently consuming content from user device 210 (e.g., listening to music via Bluetooth headphones or another audio accessory device). Based on user contextual data 208, voice interaction engine 204 determines a high availability level for the user. For example, voice interaction engine 204 may determine that the user has sufficient time and interest for fully consuming a voice interaction. For example, voice interaction engine 204 may determine that biometric measurements and user preferences from user contextual data 208 indicate the user currently prefers a Red Bull energy drink.

Voice interaction engine 204 alters a voice interaction based on the user's availability level. Voice interaction engine 204 may expand the content of the voice interaction based on the high availability level. For example, voice interaction engine 204 may extract textual data (e.g., "Drink Red Bull and Recharge!) and extend the message based on the textual data (e.g., "Hey, Drink Red Bull! Recharge with the Red Bull theme!"). In some embodiments, voice interaction engine 204 may identify a product from data 202 (e.g., based on product identifier "Red Bull"). Voice interaction engine 204 may retrieve content related to the identified product (e.g., a Red Bull commercial or a theme song). Voice interaction 212 may have been generated and/or altered to include the retrieved content (e.g., by combining the Red Bull theme song with the expanded message). Voice interaction engine 204 then causes user device 210 to output altered voice interaction 212. For example, voice interaction engine 204 may generate a synthesized audio message from the expanded text and cause user device 210 to output the audio message along with the Red Bull theme song as voice interaction 212.

A voice interaction engine (e.g., voice interaction engine 104 or 204) may summarize the voice interaction content depending on a user's availability. For example, a short message may be generated to summarize the voice interaction content for quick and easy consumption as voice interaction 112 (e.g., "Potter on C2"). In some embodiments, a summarizer model may be used to generate a summary of the voice interaction content in a suitable manner for a user to understand the gist and/or intent of the message. The summarizer model may be, for example, a text-based model that converts textual data extracted from the voice interaction content. If a user has sufficient availability for consuming content, the voice interaction engine may collect additional content related to the voice interaction and provide an altered voice interaction including the additional content that is suitable for the user's availability level. In this manner, a voice interaction may be adapted to be suitable for the user's circumstances.

Figure 3:
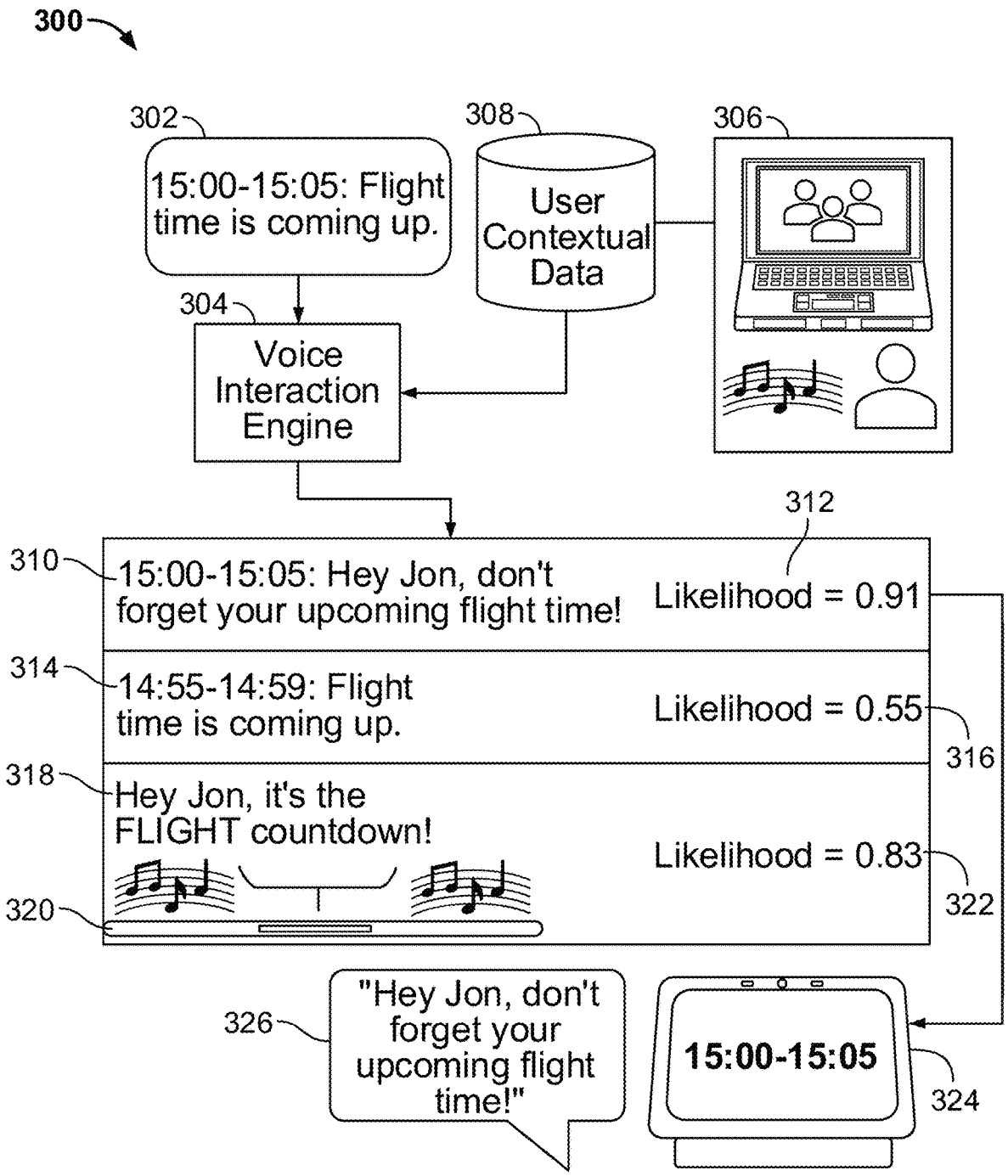
FIG. 3 shows an exemplary scenario in which a voice interaction is altered to increase consumption likelihood based on user contextual data, in accordance with some embodiments of the disclosure.

FIG. 3 shows an exemplary scenario in which system 300 alters a voice interaction to increase consumption likelihood based on user contextual data, in accordance with some embodiments of the disclosure. System 300 includes voice interaction engine 304 and device 324 (e.g., a smart hub tablet). Voice interaction engine 304 receives data 302 that causes a voice interaction to be generated. Data 302 includes an indication for when the voice interaction should be outputted for consumption (e.g., an output time interval from 15:00 to 15:05). Voice interaction engine 304 may retrieve user contextual data 308 in response to receiving data 302. User contextual data 308 indicates the circumstances depicted at user context 306. For example, a user may be currently on a video conference call with background audio as shown at user context 306. User contextual data 308 may include activity data of the video conferencing application that shows a video call is currently active. User contextual data 308 may include environment data from a sensor (e.g., a microphone) that captures the background audio.

Voice interaction engine 304 alters the voice interaction and output time interval to increase a probability of consumption (i.e., a consumption likelihood) for consuming the voice interaction based on user contextual data 308. Voice interaction engine 304 may determine the consumption likelihood based on multiple factors, including user environment, noise level, surrounding activity, urgency of the voice interaction, etc. Interactions 310, 314, and 318 are examples of altered voice interactions and/or altered output time intervals. For example, voice interaction engine 304 may have accessed the user's profile and altered interaction 310 partly to call out to the user by adding a personalized portion (e.g., "Hey Jon"). For example, voice interaction engine 304 may have modified the language, expression, and/or style to generate interaction 310.

Consumption likelihood may be determined using various analytical techniques on user contextual data (e.g., user contextual data 308). For example, voice interaction engine 304 may use a heuristics analyzer, as earlier described, to identify consumption probability factors that may affect consumption likelihood (e.g., crowd density, noise level, user activity, etc.). In some embodiments, voice interaction engine 304 may generate expected consumption probabilities for the identified consumption probability factors using suitable statistical and predictive analytical techniques. For example, voice interaction engine 304 may employ a predictive model, a decision tree, an artificial intelligence model, and/or an artificial neural network, among other techniques, to generate a consumption probability trend between a consumption probability factor and one or more voice interaction characteristics. For example, voice interaction engine 304 may have generated a mathematical and/or numerical representation of the consumption probability trend using a predictive model. Additionally or alternatively, voice interaction engine 304 accesses a database in which each factor is mapped with a quantity and/or trend that indicates an expected consumption probability relative to a voice interaction characteristic. For example, a high crowd density may be mapped to a low expected consumption probability for a five-minute output duration of the voice interaction. In another example, the user's attention level may be mapped to a high expected consumption probability for a voice interaction outputted at a particular device. In a third example, the database may contain a representation of the consumption probability trend between a consumption probability factor and one or more voice interaction characteristics (e.g., datapoints to represent the trend). Voice interaction engine 304 may then determine the expected consumption probability based on the representation. After the consumption probabilities are determined, voice interaction engine 304 combines the expected consumption probabilities to generate a consumption likelihood for the identified consumption probability factors.

Interaction 314 may be the original message from data 302 with an altered output time interval, for example, if the user has a break during the video conferencing call before 15:00. Interaction 318 has been altered to increase consumption likelihood based on the background audio. For example, interaction 318 may be altered to output within a lull or other suitable interval of the background audio. Interaction 318 may have been altered to be perceivable over the background audio, for example, by emphasizing keywords in the altered voice interaction. Voice interaction engine 304 may determine when to output the voice interaction by identifying a portion of the background audio that improves chance of consumption. Voice interaction engine 304 may alter audio characteristics of interaction 318 to overlap with the identified portion. For example, a pitch or frequency of interaction 318 may be modulated to be perceivable when overlapping with the identified portion.

Voice interaction engine 304 determines a consumption likelihood for the altered voice interaction to select a voice interaction for output with a high chance of consumption in consideration of the user's circumstances. For example, voice interaction engine 304 determines consumption likelihoods 312, 316, and 322 for interactions 310, 314, and 318, respectively. Since interaction 310 has the highest consumption likelihood of 0.91 in this case, voice interaction engine 304 selects interaction 310 for output at device 324 as voice interaction 326. It should be noted that consumption likelihood may be represented in any suitable manner (e.g., integers, graphical, decimal, percentage, etc.). In some embodiments, voice interaction engine 304 determines an optimal voice interaction content and optimal output time interval that maximizes the consumption likelihood. Voice interaction engine 304 may execute any suitable optimization procedure in order to maximize the consumption likelihood. Some examples of optimization procedures may include evolutionary types, iterative types, heuristic types, multi-objective types, neural network types, etc., and any combinations thereof. Voice interaction engine 304 then causes the altered voice interaction to be outputted during the altered output time interval (e.g., at device 324).

Figure 4:
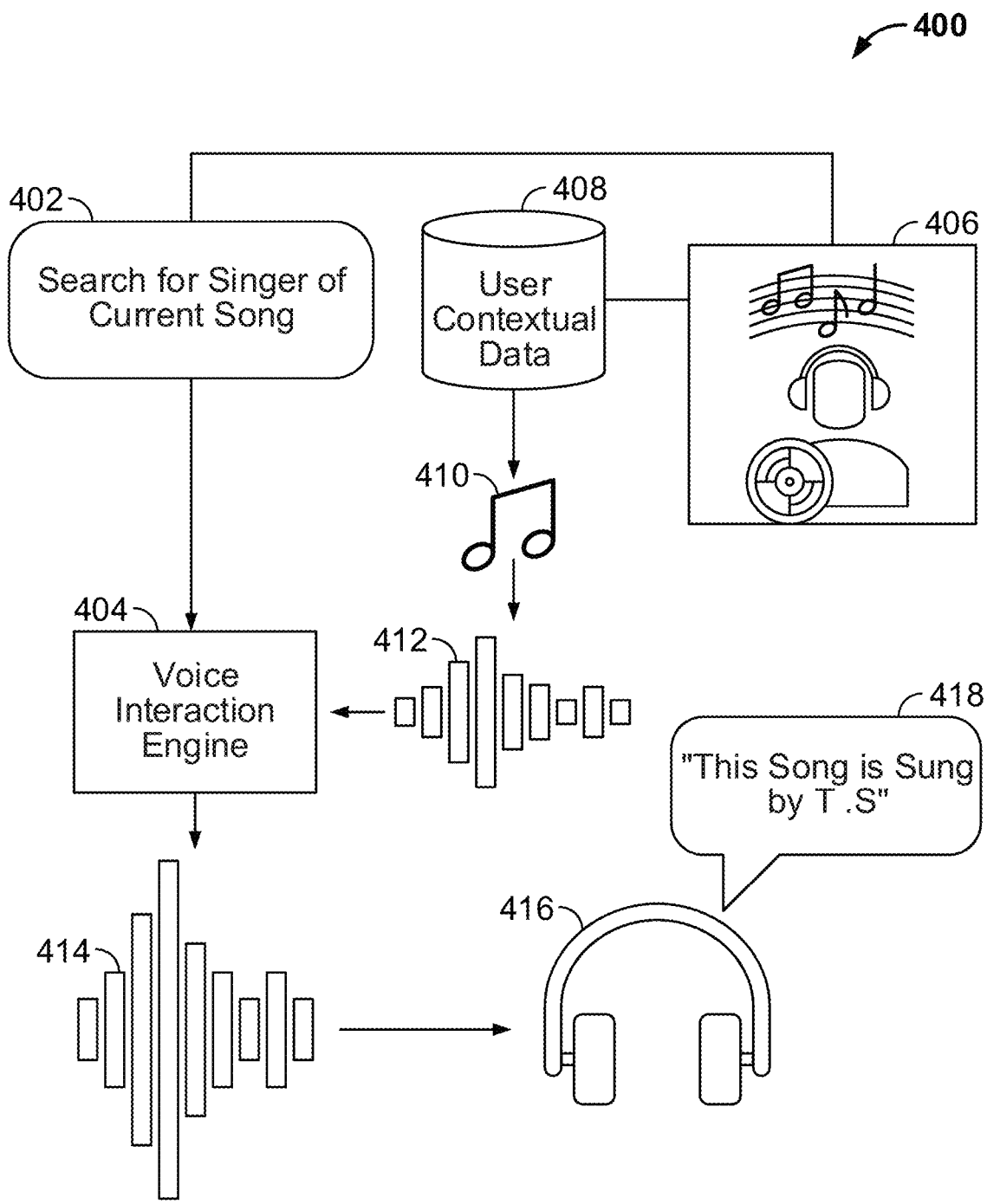
FIG. 4 shows an exemplary scenario in which audio characteristics of a voice interaction are altered based on user contextual data, in accordance with some embodiments of the disclosure.

FIG. 4 shows an exemplary scenario in which system 400 alters audio characteristics of a voice interaction based on user contextual data, in accordance with some embodiments of the disclosure. System 400 includes voice interaction engine 404 and output device 416. Voice interaction engine 404 receives data 402 that causes a voice interaction to be generated. For example, data 402 may include a voice interaction such as a voice search query (e.g., "Search for singer of current song"). Voice interaction engine 404 retrieves user contextual data 408 indicating user context 406. User context 406 may depict a user currently listening to audio content using output device 416 (e.g., via wireless headphones). User contextual data 408 may include information about the user environment and audio content (e.g., metadata, audio characteristics, playback duration, etc.). For example, audio characteristics are determined from user contextual data 408. For example, voice interaction engine 404 determines audio characteristic 412 of utterance 410 from user contextual data 408. Utterance 410 may be a repeated sound from the user environment or a portion from the currently presented audio content. Based on audio characteristic 412, voice interaction engine 404 alters one or more audio characteristics of the voice interaction. In some embodiments, the voice interaction is altered to overcome utterance 410. For example, audio characteristic 412 may be a frequency characteristic of utterance 410 (e.g., with a "C1" harmonic). Voice interaction engine 404 may alter an audio frequency of the voice interaction to overcome utterance 410 by modulating the voice interaction to be an overtone 414 (e.g., a "C3" harmonic) of audio characteristic 412. Audio characteristics of the voice interaction are altered to make the voice interaction perceivable when overlapping with utterance 410 or any other suitable noise in the user's environment. Voice interaction engine 404 then causes output of altered voice interaction 418 at output device 416. For example, altered voice interaction 418 may be a result of the query from data 402 (e.g., "This song is sung by T. S."). Voice interaction engine 404 causes output device 416 to present altered voice interaction 418 with overtone 414 and overlapping with utterance 410. In this manner, altered voice interaction 418 is perceivable (e.g., in a noisy environment) and can be consumed by the user while continuing to listen to the audio content.

Voice interaction engine 404 may identify and select which audio characteristics of the voice interaction to alter. In some embodiments, voice interaction engine 404 compares a selected audio characteristic with audio characteristic 412. The selected audio characteristic may be altered as a function of audio characteristic 412. For example, if audio characteristic 412 is a "C1" harmonic, the selected audio characteristic may be altered as a multiple of the "C1" harmonic. In some embodiments, audio characteristic 412 may include a repetitive pattern (e.g., a beat), and the voice interaction is altered to overcome and/or be perceivable when overlapping with the repetitive pattern.

Audio characteristics of the voice interaction may be altered for a particular duration. In some embodiments, voice interaction engine 404 maintains one or more altered audio characteristics based on the overlap with the audio content and the environment's sounds at user context 406. For example, utterance 410 may be a refrain in the audio content with a duration of 10 seconds, and a pitch of altered voice interaction 418 may have been altered to be perceivable when overlapping with the refrain. If altered voice interaction 418 is shorter than the refrain, voice interaction engine 404 maintains the altered pitch as appropriate. If altered voice interaction 418 is longer than the refrain, voice interaction engine 404 maintains the altered pitch for the duration of the refrain and may output altered voice interaction 418 with the original pitch if it is still perceivable. Additionally or alternatively, voice interaction engine 404 may alter the pitch or another audio characteristic of altered voice interaction 418 to fit a subsequent utterance until altered voice interaction 418 is fully presented and consumed.

Figure 5:
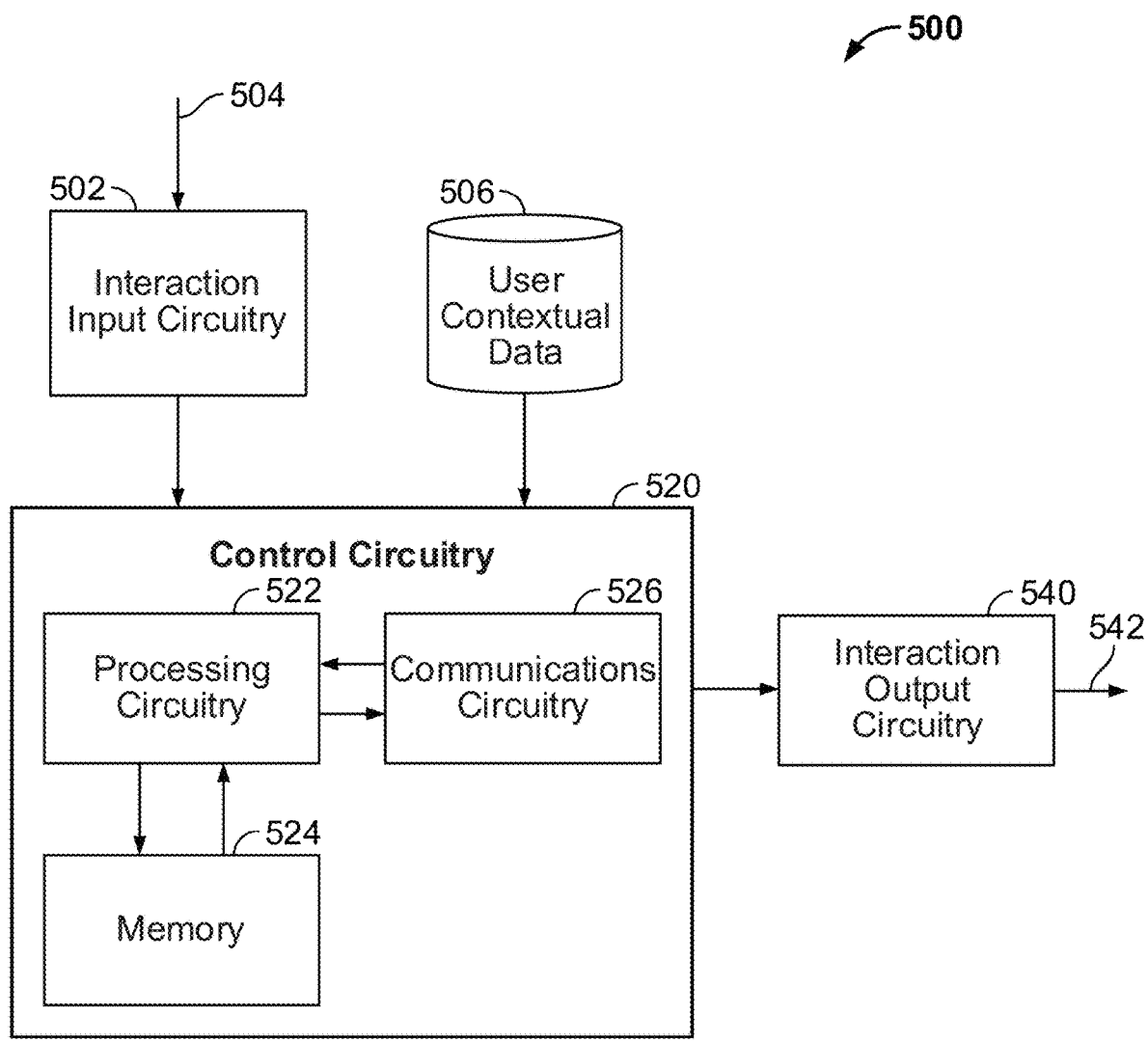
FIG. 5 is a block diagram showing components and data flow therebetween of a system for altering a voice interaction to improve consumption in line with the user's availability based on user contextual data, in accordance with some embodiments of the disclosure.

FIG. 5 is a block diagram showing components and data flow therebetween of system 500 for altering a voice interaction to improve consumption for the user's availability based on user contextual data, in accordance with some embodiments of the disclosure. Interaction input circuitry 502 receives data 504 that causes a voice interaction to be generated. Data 504 may include or be a prompt, a voice interaction, a signal, an instruction, an alert, a command, a selection of an option, or any other suitable indication that results in a voice interaction. Interaction input circuitry 502 may be part of a device hosting an implementation of the present disclosure; a separate device (e.g., a smart hub device, a user's smartphone, a smart TV, etc.); or part of a remote server connected with an implementation of the present disclosure. Interaction input circuitry 502 may be fully or partially implemented in any suitable manner on these or any other exemplary devices. For example, interaction input circuitry 502 may include a voice input interface at a smart home device coupled with communications circuitry at a remote server. Interaction input circuitry 502 may be a data interface such as a Bluetooth module, WiFi module, or any other suitable data interface through which data entered on another device or audio data captured by another device can be received. Alternatively, interaction input circuitry 502 may include a microphone through which voice and audio information is captured directly. Interaction input circuitry 502 may convert the information to a digital format such as WAV, MP4, AAC, MP3, ALAC, OGG, etc.

Interaction input circuitry 502 transmits the received data 504 to control circuitry 520. Control circuitry 520 may be based on any suitable processing circuitry. Control circuitry 520 includes processing circuitry 522, memory 524, and communications circuitry 526. Data 504 may be received by processing circuitry 522 directly and/or via communications circuitry 526. Processing circuitry 522 may include any suitable circuitry configured to perform various voice interaction functions. It should be noted processing circuitry 522 may be configured for various audio-related functions, and the following examples are not intended to be exhaustive. For example, processing circuitry 522 may be configured for providing, analyzing, generating, identifying, evaluating, and/or altering voice interactions, or any suitable combinations thereof. For example, processing circuitry 522 may be configured to perform audio analysis functions including frequency domain analysis, level and gain analysis, harmonic distortion analysis, etc. For example, processing circuitry 522 may be configured for various audio modification functions including audio modulation, audio synthesizing, combining, trimming, etc. Upon receiving data 504, processing circuitry 522 retrieves user contextual data 506. For example, in response to receiving user contextual data 506, processing circuitry 522 may send an instruction to communications circuitry 526 to retrieve user contextual data 506. In another example, processing circuitry 522 may access a user device, a remote server, or other repository storing user contextual data 506. For example, processing circuitry 522 transmits an instruction to a user device to collect and send back user contextual data 506 to control circuitry 520.

Processing circuitry 522 determines user availability based on user contextual data 506. In some embodiments, processing circuitry 522 determines a user availability level for consuming the voice interaction based on current user contextual data. Processing circuitry 522 then alters a voice interaction to be suitable for consumption based on the user's availability (e.g., based on the user availability level). For example, processing circuitry 522 may be configured to compute the user availability level based on multiple factors from user contextual data 506. Processing circuitry 522 may execute heuristics analysis or other suitable analytical techniques to identify the factors related to the user's availability and compute a relevance score or other measure of impact on the user's availability for each factor. Processing circuitry 522 may then determine the user availability level based on the scores. For example, if the user availability level is high, processing circuitry 522 may provide a voice interaction with minimal alteration or a voice interaction with expanded content. Processing circuitry 522 may cause communications circuitry 526 to retrieve additional content for extending the voice interaction. For example, processing circuitry 522 may transmit an instruction to communications circuitry 526 to retrieve the additional content from multiple content sources (e.g., a content provider such as Amazon). In response, communications circuitry 526 retrieves content (e.g., a commercial or information related to data 504) for access by processing circuitry 522. For example, communications circuitry 526 may store the retrieved content in memory 524 for later access by processing circuitry 522. For example, communications circuitry 526 may directly provide processing circuitry 522 with the retrieved content.

Processing circuitry 522 then combines the additional content with the voice interaction to generate an altered voice interaction based on the high user availability level.

Additionally or alternatively, processing circuitry 522 may determine a consumption likelihood based on user contextual data 506. The consumption likelihood may be a metric of how likely a user can fully consume a voice interaction. In some embodiments, processing circuitry 522 alters a voice interaction and an output time interval to increase the consumption likelihood. For example, data 504 may include an indication that the voice interaction should be outputted immediately upon receipt of data 504 (e.g., a voice notification marked "Urgent"). Processing circuitry 522 may have determined, based on user contextual data 506, that the user is on a call. In one approach, processing circuitry 522 may determine that the call will be finished within five minutes (e.g., based on the expected call duration from the user's calendar data and/or based on near real-time processing of audio of the conversation) and that the user is more likely to consume the voice interaction upon finishing the call. Processing circuitry 522 may then alter the output time of the voice interaction from immediate to in five minutes and/or once the call has ended. In another non-limiting approach, processing circuitry 522 may alter the voice interaction to increase the consumption likelihood, for example, by summarizing the voice interaction content and/or altering the voice interaction audio characteristics to not interfere with the conversation when overlapped with the call audio. For example, the voice interaction may be a reminder for an appointment. The altered voice interaction may be "Appointment in 5," and the volume, pitch, and other audio characteristics may be adjusted to overlap with the call audio while remaining perceivable to the user.

Processing circuitry 522 may optionally determine an optimal voice interaction for consumption by maximizing the consumption likelihood. For example, a user may be engaged with video content on user equipment (e.g., a movie on a smart TV). Processing circuitry 522 may determine, based on user contextual data 506, to provide a voice interaction including optimal content at an optimal output period. In one exemplary approach, processing circuitry 522 may generate multiple alterations of a voice interaction based on data 504 and computes a consumption likelihood for each alteration. Processing circuitry 522 may store the alterations and associated data in memory 524 if beneficial. Processing circuitry 522 may use any suitable optimization scheme or combinations of optimization schemes. For example, processing circuitry 522 may apply a machine learning model including artificial neural networks, artificial intelligence, etc., for determining an optimal voice interaction based on user contextual data 506 and any other related data. For example, processing circuitry 522 may execute a neural network configured to maximize the consumption likelihood.

Using the optimization scheme, processing circuitry 522 may determine optimal content and optimal output time period for the voice interaction from the generated alterations that improve chance of consumption. For example, processing circuitry 522 may determine that the maximum consumption likelihood is a voice interaction that is altered to emphasize keywords and outputted during an upcoming expository scene of the video content. In another example, processing circuitry 522 may determine the voice interaction should be expanded to include content from the currently playing video content and outputted during a portion that the user has previously watched and that may be of less interest to the user (e.g., based on a user viewing history and/or user preferences).

In these and other approaches and combinations thereof, control circuitry 520 generates an altered voice interaction for improved consumption based on user availability and/or consumption probability. Interaction output circuitry 540 then outputs altered voice interaction 542. Interaction output circuitry 540 may be part of control circuitry 520. Interaction output circuitry 540 may be part of the same device as interaction input circuitry 502. Interaction output circuitry 540 may be a separate device suitable for outputting altered voice interaction 542. Interaction output circuitry 540 may be a hub connected to multiple devices that are capable of outputting altered voice interaction 542 fully or partially via a combination of interconnected devices. For example, interaction output circuitry 540 may include a remote device linked via a network. For example, interaction output circuitry 540 may include a smart home hub connected with speakers and a display. In some embodiments, control circuitry 520 may cause the appropriate devices and associated circuitry to output altered voice interaction 542. Additionally or alternatively, control circuitry 520 transmits suitable instructions to interaction output circuitry 540, which then outputs altered voice interaction 542 via the appropriate devices. For example, processing circuitry 522 may have generated altered voice interaction 542. Processing circuitry 522 may additionally generate the instructions that select which device(s) to output altered voice interaction 542. Processing circuitry 522 may then cause communications circuitry 526 to transmit altered voice interaction 542 and the instructions to interaction output circuitry 540. Interaction output circuitry 540 may then provide altered voice interaction 542 according to the instructions.

Figure 6:
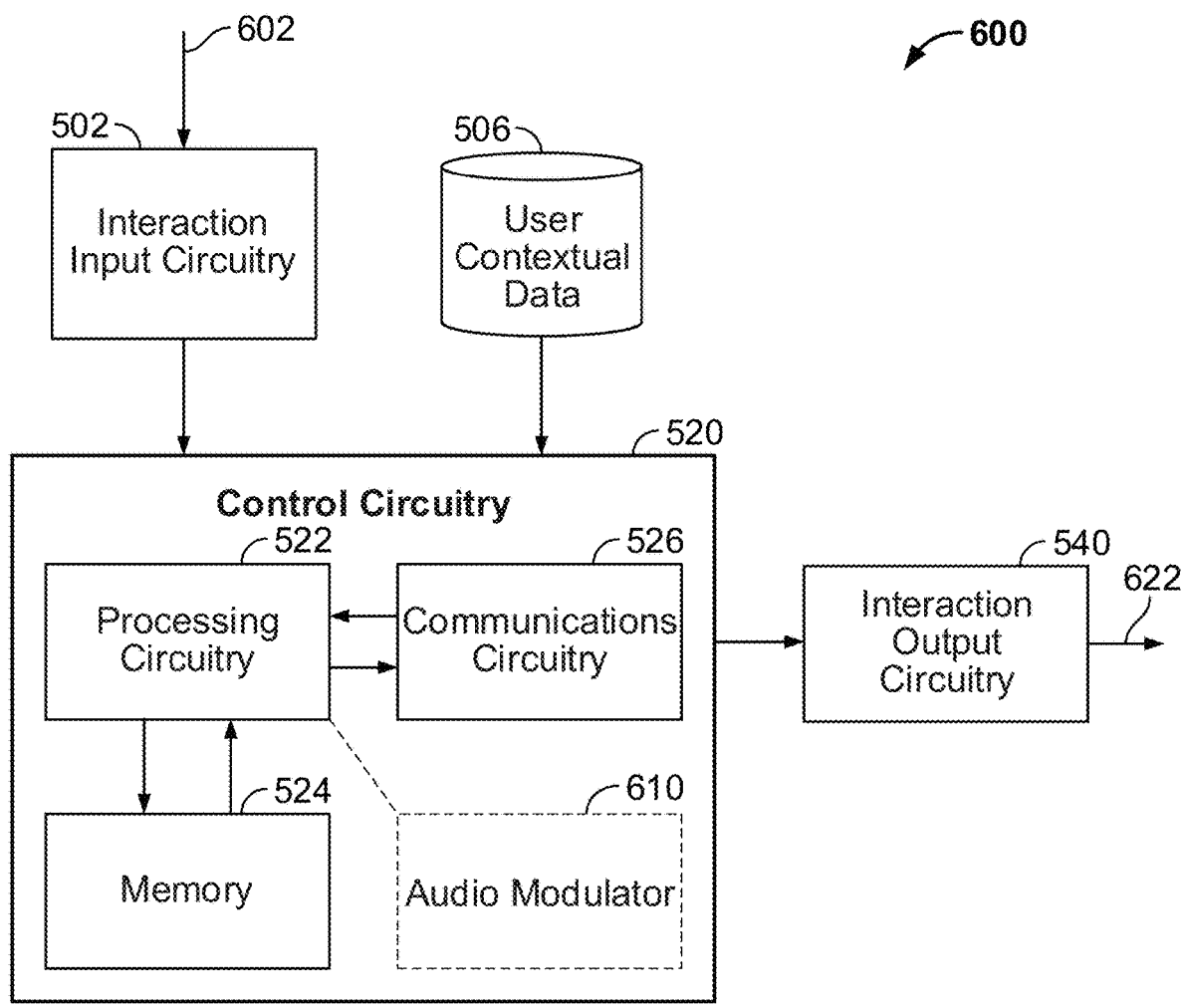
FIG. 6 is a block diagram showing components and data flow therebetween of a system for altering audio characteristics of a voice interaction based on user contextual data, in accordance with some embodiments of the disclosure.

FIG. 6 is a block diagram showing components and data flow therebetween of system 600 for altering audio characteristics of a voice interaction based on user contextual data, in accordance with some embodiments of the disclosure. In some embodiments, system 600 may be system 500 including audio modulator 610. In other embodiments, system 600 is a separate system including substantially similar components as system 500 and configured for various audio-related functions including audio modulation. Data flow and circuitry in system 600 may be similar as described in relation to system 500. For illustration, system 600 will be described as similar to system 500 including audio modulator 610, but this should be considered non-limiting. The following is intended to illustrate the data flow and circuitry involved in various embodiments related to altering audio characteristics of a voice interaction to be suitable for consumption depending on a user's circumstances (e.g., while consuming audio content). For system 600, interaction input circuitry 502 receives data 602 that causes a voice interaction to be generated. Data 602 may include information about audio characteristics and an output time interval for the voice interaction. Interaction input circuitry 502 may then provide data 602 to control circuitry 520, for example, by transmitting data 602 directly to processing circuitry 522.

Processing circuitry 522 may perform various audio-related functions on a voice interaction using audio modulator 610. While audio modulator 610 is shown as a separate component in control circuitry 520, audio modulator 610 may be part of processing circuitry 522 and/or coupled with memory 524 and communications circuitry 526. Audio modulator 610 may be configured to perform any audio-related functions by processing circuitry 522 including analysis, evaluation, alteration, generation, synthesis, etc.

Processing circuitry 522 retrieves user contextual data 506, for example, via communications circuitry 526. Processing circuitry 522 identifies, from user contextual data 506, audio that may interfere with consumption of a voice interaction (e.g., background noise, audio content that is currently playing, etc.). In some embodiments, processing circuitry 522 determines audio characteristics of an utterance near a location for outputting the voice interaction. For example, processing circuitry 522, using audio modulator 610, analyzes the audio from user contextual data 506. Processing circuitry 522 may execute a Fourier analysis algorithm or another suitable audio analytical procedure and separate various waveforms to distinguish background noises, etc., from the audio. From the separated waveforms, processing circuitry 522 may identify an utterance (e.g., a beat, refrain, a repeated "Ah" sound, etc.) and associated audio characteristics.

Once identified, processing circuitry 522 alters the audio characteristics of the voice interaction based on data 604 to overcome the utterance and adjust the voice interaction to be suitable for consumption when overlapping with the utterance. For example, processing circuitry 522 may have identified a suitable rhythm during which a voice interaction is perceivable when appropriately altered. Processing circuitry 522, using audio modulator 610, then alters one or more audio characteristics of the voice interaction. In one example, the rhythm is mainly around the second and third octaves and processing circuitry 522 alters an audio frequency band of the voice interaction to be perceivable based on the octaves. In another example, processing circuitry 522, using audio modulator 610, modifies the timbre and localization of the voice interaction to be perceivable over the rhythm (e.g., treble and perceived location of the audio). Processing circuitry 522, using audio modulator 610, may alter any audio characteristics to improve audio perception of the voice interaction based on user contextual data 506 including noise, timbre, localization, balance, intensity, tone, etc., and combinations thereof. After the altering, control circuitry 520 causes interaction output circuitry 540 to output altered voice interaction 622. For example, altered voice interaction 622 is outputted over the identified utterance, resulting in improved consumption of altered voice interaction 622 without being perceived as a potential disturbance for the user.

At FIGS. 5 and 6, interaction input circuitry 502 may be part of or coupled to a user device. A user device may be configured to provide data 504 for interaction input circuitry 502 (e.g., utilizing any suitable user input interface such as a voice input interface). Interaction input circuitry 502 may include or be any suitable device such as a user interface including a remote control, mouse, trackball, keypad, keyboard, touchscreen, touchpad, stylus input, joystick, microphone, voice recognition interface, or other user input interfaces. Interaction input circuitry may be part of a display and associated circuitry and may be provided as a stand-alone device, integrated with user equipment, or integrated with other elements of a system described herein. For example, a display may include touch-sensitive and/or audio sensors and may include but is not limited to any of the following or combinations thereof: a monitor, a television, a liquid crystal display (LCD) for a mobile device, or any other suitable equipment for displaying content. It should be appreciated that interface input circuitry may alternatively or additionally be configured to detect and receive any kind of input (e.g., text-based input, touch input, biometric input, or any combination thereof). Control circuitry 520 may be configured to detect and identify any input from interaction input interface 502.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include, with associated circuitry, a multi-core processor (e.g., dual-core, quad-core, hexa-core, or any suitable number of cores), supercomputer, nanoscale processor, and/or quantum-based processor. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Control circuitry 520 may include any suitable circuitry and/or other components or may be connected to suitable circuitry and/or other components for performing various functions in addition to those provided in the present disclosure. It should be noted that the various components of control circuitry 520 may be coupled together, part of a single device, and/or partially implemented on multiple devices but interconnected to enable data flow between all components.

As referred to herein, communications circuitry may include input/output (I/O) paths and associated circuitry. Communications circuitry may include a network connection such as an Ethernet port, WiFi module, or any other data connection suitable for communicating with connected devices, a remote server, or any other part of a network. Communications circuitry may include an external component, device, and/or other circuitry for connecting to a wired or wireless local or remote communications network. Such communications may involve the Internet or any other suitable communications networks or paths. In addition, communications circuitry may include circuitry that enables peer-to-peer communication of user equipment devices (e.g., WiFi-direct, Bluetooth, Bluetooth Low Energy, Near-field communication, service provider proprietary networks, wired connections, etc.), or communication of user equipment devices in locations remote from each other. Bluetooth is a certification mark owned by Bluetooth SIG, INC.

Communications circuitry may include or be one or more networks such as the Internet, a mobile phone network, mobile device (e.g., iPhone) network, cable network, public switched telephone network, or other types of communications network or combinations of communications networks. The various communications paths may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. These and associated circuitry may follow a suitable broadband technology standard (e.g., a 5G standard). Data flow between components may be via any suitable communications path. Communications with any devices and within a device (e.g., user devices, user equipment, remote servers, etc.) may be provided by one or more of these communications paths but are shown as a single path in the drawings to avoid overcomplicating the drawings.

Although communications paths are not drawn, control circuitry 520 may communicate directly with other circuitry via communications paths, as well other short-range pointto-point communications paths, wireless paths (e.g., Bluetooth, infrared, IEEE 902-11x, etc.), or other short-range communication via wired or wireless paths. The associated devices may also communicate with each other directly through an indirect path via a network.

Memory 524 may include or be random-access memory, read-only memory, or any other suitable memory, hard drives, optical drives, or any other suitable fixed or removable storage devices. Memory 524 may include one or more of the above types of storage devices. Memory 524 may store instructions that, when executed by control circuitry 520, cause the steps described above and below to be performed by a voice interaction engine. Memory 524 may be used to store various types of content described herein and application data, including content information and/or application settings, user preferences or profile information, or other data used in operating the voice interaction engine. For example, memory 524 may store instructionsthat, when executed by control circuitry 520, cause performance of the voice interaction engine as described above and below. Nonvolatile memory may also be used (e.g., to launch a boot-up routine and other instructions). Control circuitry 520 may be coupled to additional hardware or software for executing instructions by the voice interaction engine. For example, control circuitry 520 may include hardware, and firmware associated with the hardware, for accelerating any processing, determining, identifying, optimizing, etc., involved with altering a voice interaction.

Figure 7:
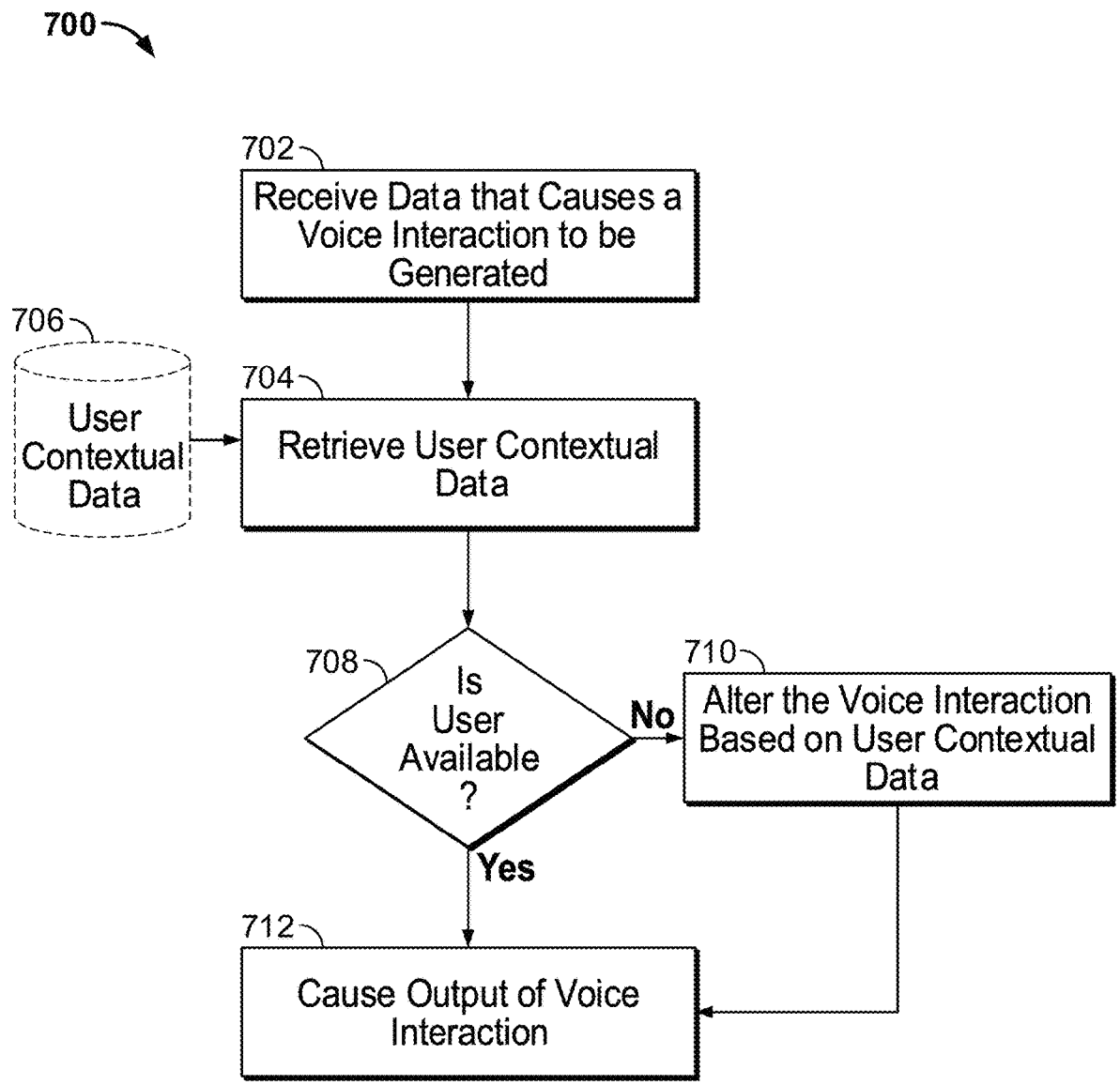
FIG. 7 shows a flowchart representing a process for altering a voice interaction based on user contextual data, in accordance with some embodiments of the disclosure.

FIG. 7 shows a flowchart representing a process 700 for altering a voice interaction based on user contextual data, in accordance with some embodiments of the disclosure. Process 700 may be implemented on control circuitry 520. At 702, control circuitry 520 receives data that causes a voice interaction to be generated. At 704, control circuitry 520 retrieves user contextual data 706. For example, control circuitry 520 may cause a user device to collect and provide user contextual data 706 including device activity and/or user environment data. Various user data including user contextual data 706 may be collected and stored in memory as part of a regular background process on the user device. Control circuitry 520 accesses the memory of the user device and retrieves user contextual data 706. Control circuitry 520 may determine the relevant user data as user contextual data 706, for example, by using a heuristics analyzer and/or accessing a database to identify user contextual factors and associated user contextual data.

At 708, control circuitry 520 determines availability of the user based on user contextual data 706. For example, control circuitry 520 may determine whether the user is available for consuming a voice interaction. In another example, control circuitry 520 may determine a crowd density and/or a noise level for the user's surroundings from user contextual data 706. In a third example, control circuitry 520 may determine an engagement level of the user for content currently being presented. Control circuitry 520 may determine availability of the user, for example, based on a user availability level and/or a consumption likelihood. If the user is available ("Yes"), processing continues to step 712. At 712, control circuitry 520 causes output of the voice interaction. Control circuitry 520 may generate the voice interaction and transmit an instruction for an output device to present the voice interaction. Alternatively, control circuitry 520 may transmit an instruction that causes an output device to generate the voice interaction based on the received data at 702. If the user is not available ("No"), processing continues to step 710. At 710, control circuitry 520 alters the voice interaction based on user contextual data 706 (e.g., to be suitable for the user to consume based on the user's availability). This may be accomplished, for example, using any of the systems and techniques as described in relation to FIGS. 1-6 and is further explained in connection to FIGS. 8-11. Then, at 712, control circuitry 520 causes output of the altered voice interaction. For example, control circuitry 520 may generate and provide the altered voice interaction for output at a smart hub device.

Figure 8:
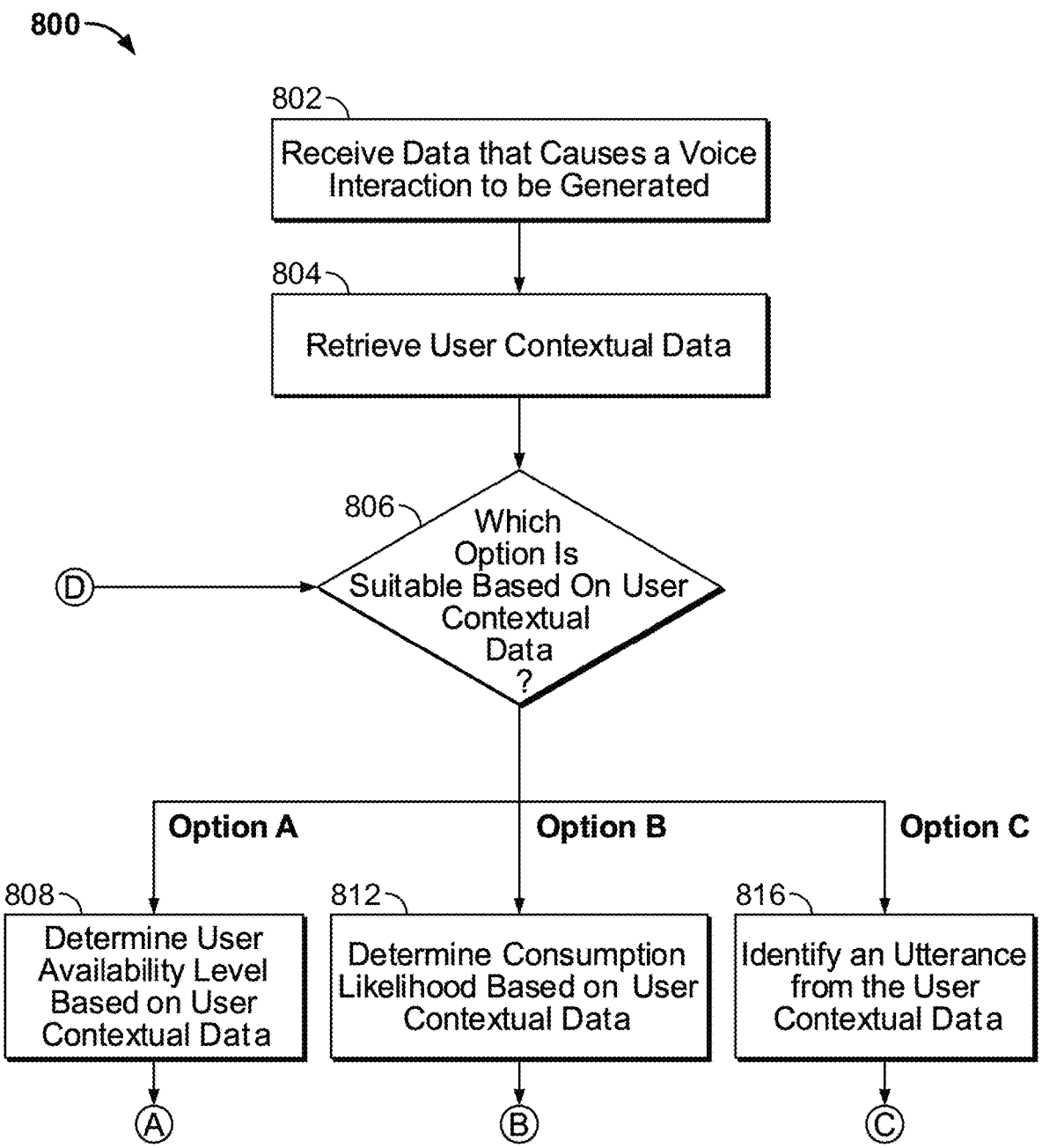
FIG. 8 shows a flowchart representing a process for altering a voice interaction using one or more suitable options based on user contextual data, in accordance with some embodiments of the disclosure.
Figure 8:
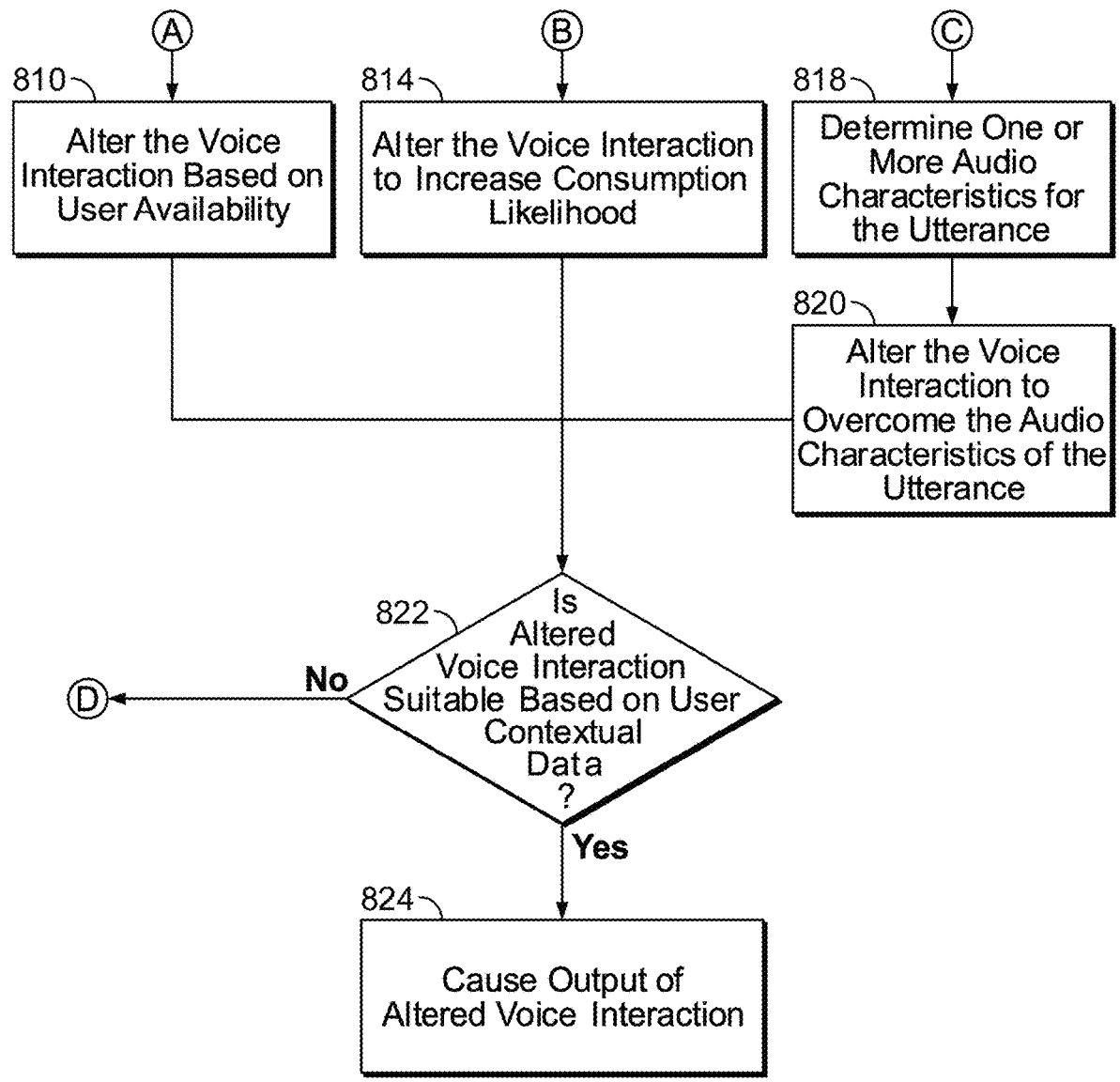

FIG. 8 shows a flowchart representing a process 800 for altering a voice interaction using one or more suitable options based on user contextual data, in accordance with some embodiments of the disclosure. Process 800 may be implemented on control circuitry 520. At 802, control circuitry 520 receives data that causes a voice interaction to be generated. At 804, control circuitry 520 retrieves user contextual data, for example, to determine availability of the user and modify the voice interaction according to the availability. Control circuitry 520 may retrieve the user contextual data, for example, by accessing a remote server that stores user data. Control circuitry 520 then identifies and retrieves the user contextual data. At 806, control circuitry 520 determines which option is suitable for altering the voice interaction based on the user contextual data. Multiple factors from the user contextual data may be used to determine a suitable option. Further details are provided in relation to FIG. 9. Options A, B, and C highlight some embodiments of the present disclosure, but these should be considered non-limiting. Control circuitry 520 may determine other options that are suitable in accordance with various embodiments of the disclosure.

If option A is suitable, processing continues to step 808 and follows path A. At 808, control circuitry 520 determines a user availability level based on the user contextual data. At 810, control circuitry 520 alters the voice interaction based on the user availability level. Some techniques for altering the voice interaction have been previously described. For example, control circuitry 520 may modify content of the voice interaction to be easily consumed if the user is currently on a video conference call.

If option B is suitable, processing continues to step 812 and follows path B. At 812, control circuitry 520 determines a consumption likelihood based on the user contextual data. For example, control circuitry 520 may determine a low consumption likelihood for a long voice interaction if the user is currently distracted from a device to be used for outputting the voice interaction. At 814, control circuitry 520 alters the voice interaction to increase the consumption likelihood. For example, control circuitry 520 may adjust the tone to emphasize keywords in the voice interaction. For example, control circuitry 520 may modify the output time period of the voice interaction by determining when the user is most available.

If option C is suitable, processing continues to step 816 and follows path C. At 816, control circuitry 520 identifies an utterance from the user contextual data. At 818, control circuitry 520 determines one or more audio characteristics for the utterance. For example, control circuitry 520 analyzes frequency and pitch of the utterance. At 820, control circuitry 520 alters the voice interaction to overcome the audio characteristics of the utterance. For example, control circuitry 520 alters the frequency as an overtone of the frequency of the utterance. Control circuitry 520 alters the voice interaction to be perceivable over the utterance.

After altering a voice interaction via any of options A, B, and C, processing then continues to step 822. At 822, control circuitry 520 determines whether to further alter the voice interaction based on the user contextual data. At 822, control circuitry 520 determines if the altered voice interaction is suitable for the user to consume. If not ("No"), processing continues along loop D back to step 806 to determine which option would be suitable. Control circuitry 520 may continue to further alter the voice interaction to suit the user's circumstances. Once control circuitry 520 determines that the altered voice interaction is suitable for the user to consume ("Yes"), processing continues to step 824. At 824, control circuitry 520 causes output of the altered voice interaction (e.g., at a device near the user).

Figure 9:
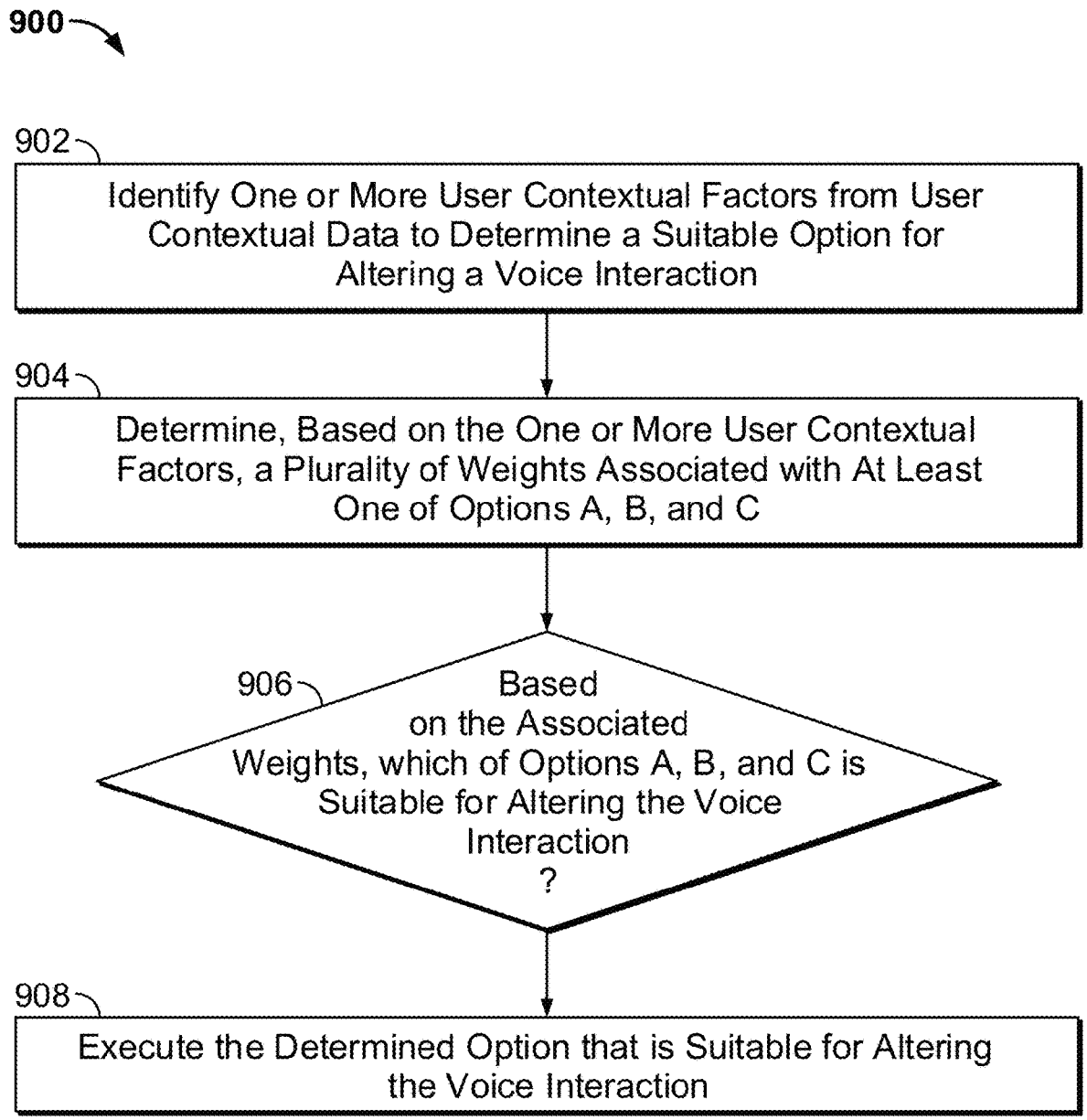
FIG. 9 shows a flowchart representing a process for determining a suitable option for altering a voice interaction based on user contextual data, in accordance with some embodiments of the disclosure.

FIG. 9 shows a flowchart representing a process 900 for determining a suitable option for altering a voice interaction based on user contextual data, in accordance with some embodiments of the disclosure. In some embodiments, process 900 is a process of how control circuitry determines which option(s) to perform based on user contextual data at 806. Process 900 may be implemented on control circuitry 520. At 902, control circuitry 520 identifies one or more user contextual factors from the user contextual data. Control circuitry 520 uses the user contextual factors to determine a suitable option for altering the voice interaction. For example, control circuitry 520 may determine that the user's circumstances permit a summarized voice interaction. Alternatively or additionally, control circuitry 520 may determine that the user is more likely to consume a voice interaction that includes a personalized message for the user. As another option, control circuitry 520 may determine that the user is currently consuming audio content and is likely to consume a voice interaction that is altered to supersede a particular portion of the audio content.

Control circuitry 520 may determine which of the user contextual factors are relevant for determining the suitable option and/or suitable combination of options, for example, by determining weights associated with each option or combination of options. At 904, control circuitry 520 determines, based on the user contextual factors, a plurality of weights associated with at least one of options A, B, and C as described in connection with FIG. 8. At 906, control circuitry 520 determines which of the options A, B, and C is suitable for altering the voice interaction based on the weights. This may be accomplished by computing weights for a user's attentiveness, interest, consumption time, etc., based on the user contextual data. For example, control circuitry 520 may determine a high attentiveness and/or interest weight if a user device indicates that the user is actively engaged with content and may result in expanding the voice interaction content (e.g., via option A). At 908, control circuitry 520 then executes the option determined to be suitable for altering the voice interaction.

Figure 10:
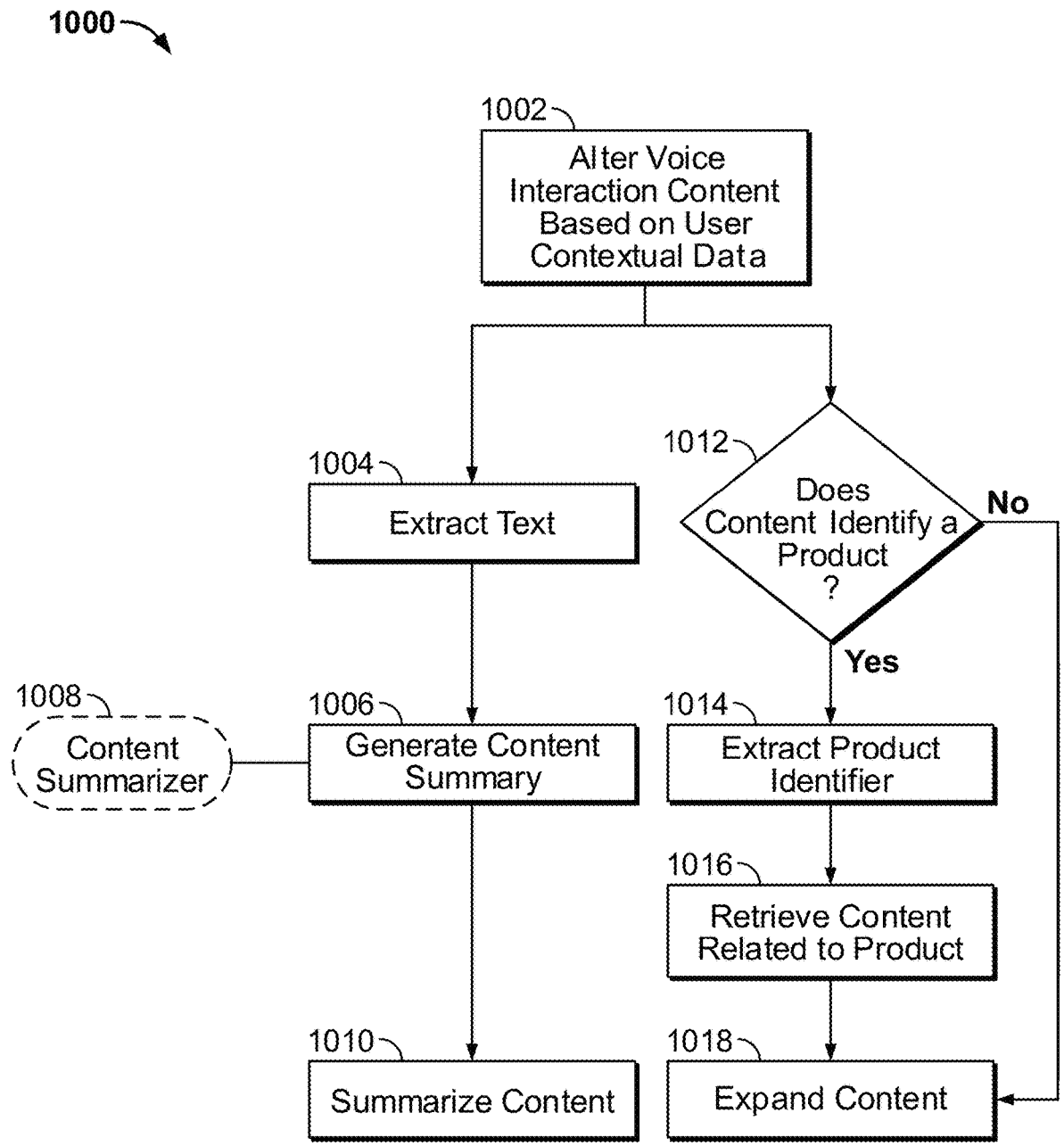
FIG. 10 shows a flowchart representing a process for altering content of a voice interaction based on user contextual data, in accordance with some embodiments of the disclosure.

FIG. 10 shows a flowchart representing a process 1000 for altering content of a voice interaction based on user contextual data, in accordance with some embodiments of the disclosure. Process 1000 may be included, for example, as part of option A described in connection with FIG. 8. Process 1000 may be implemented on control circuitry 520. At 1002, control circuitry 520 alters voice interaction content based on user contextual data. Control circuitry 520 may then perform the following steps depending on which results in a more suitable voice interaction for consumption depending on the user's situation. After summarizing or expanding the voice interaction content, control circuitry 520 then provides the summarized voice interaction content to generate the altered voice interaction for output (e.g., at a smart home device).

If the voice interaction is more suitable after summarizing the voice interaction content, processing continues to 1004. At 1004, control circuitry 520 extracts textual data from the voice interaction content. Control circuitry 520 may use any techniques used for extracting text from various types of content including information extraction techniques (e.g., optical character recognition, natural language processing, etc.). At 1006, control circuitry 520 generates a content summary based on the extracted textual data. For example, control circuitry 520 may employ a content summarizer 1008 or a text-based model to generate the content summary. At 1010, control circuitry 520 summarizes the voice interaction content, for example, by altering the voice interaction content to include the content summary.

If the voice interaction is more suitable after expanding the voice interaction content, processing continues to 1012. At 1012, control circuitry 520 determines if the voice interaction content includes a product identifier. For example, the voice interaction content may include a product name such as "Nike" and/or a product logo. If the voice interaction content does not identify a product ("No"), processing continues to 1018, at which control circuitry 520 expands the voice interaction content based on the user contextual data. For example, control circuitry 520 may modify the voice interaction content to include a personalized message to attract the user's attention. If the voice interaction content identifies a product ("Yes"), processing continues to 1014. At 1014, control circuitry 520 extracts the product identifier (e.g., the product logo for Nike). At 1016, control circuitry 520 retrieves content related to the product identifier as part of expanding the voice interaction content. For example, control circuitry 520 may retrieve advertisement content related to the product (e.g., a Nike commercial). For example, control circuitry 520 may transmit a search query for trending news related to the product (e.g., latest news about Nike). At 1018, control circuitry 520 expands the voice interaction content based on the retrieved content (e.g., by including the latest news about Nike) and the user contextual data.

Figure 11:
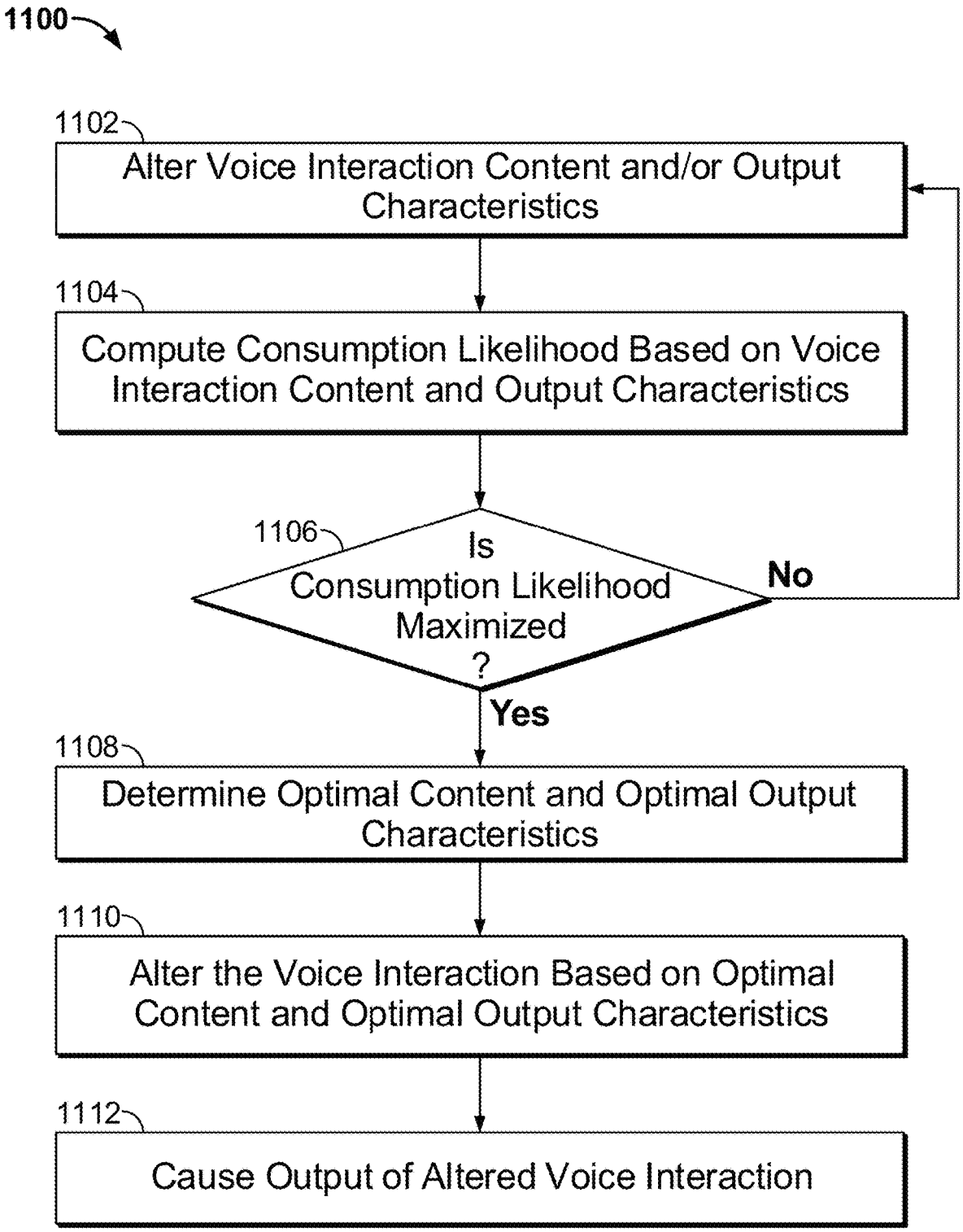
FIG. 11 shows a flowchart representing a process for determining optimal content and optimal output characteristics for a voice interaction based on a consumption likelihood, in accordance with some embodiments of the disclosure.

FIG. 11 shows a flowchart representing a process 1100 for determining optimal content and optimal output characteristics for a voice interaction based on a consumption likelihood, in accordance with some embodiments of the disclosure. Process 1100 may be implemented on control circuitry 520. Process 1100 may be part of, for example, option B described in connection with FIG. 8. At 1102, control circuitry 520 alters content and/or output characteristics of a voice interaction (e.g., audio characteristics, output time period, output time interval, output duration, etc.) using various techniques described in the present disclosure or combinations thereof. For example, control circuitry 520 may combine a product commercial with the voice interaction content, adjust when to present the altered voice interaction, and select a suitable device for the presentation. At 1104, control circuitry 520 computes a consumption likelihood for the voice interaction based on the altered content and output characteristics. For example, control circuitry 520 may determine the consumption likelihood based on factors in the user contextual data including user environment, noise level, surroundings, environment acoustics, voice interaction importance, subject of the content, etc. Control circuitry 520 may, for example, determine that the user is busy but especially attentive to a voice interaction from a smart watch, resulting in a high consumption likelihood if output via the smart watch. As another example, control circuitry 520 may determine that the user is expecting a message from a particular acquaintance and is more likely to consume a voice interaction that includes an indication that the voice interaction is from the acquaintance. Control circuitry 520 may also determine a time at which the consumption likelihood will be greater. Control circuitry 520 then delays the output of the voice interaction by determining an appropriate starting time for the output.

At 1106, control circuitry 520 determines if the consumption likelihood is maximized. For example, control circuitry 520 generates a plurality of altered voice interactions, computes the consumption likelihood for each, and selects the voice interaction with the maximum likelihood. Control circuitry 520 may compute the consumption likelihood as each altered voice interaction is generated. In some embodiments, control circuitry 520 compares the consumption likelihood against a threshold to indicate sufficient chance that the voice interaction is fully consumed. In some embodiments, control circuitry 520 employs optimization techniques (e.g., global optimization) to maximize the consumption likelihood. For example, control circuitry 520 may apply a heuristic approach including evolutionary algorithms (e.g., genetic optimization) to obtain a voice interaction with a maximized consumption likelihood. For example, control circuitry 520 may apply a probabilistic approach including Bayesian optimization. These and other approaches may be combined with various algorithms for improving their performance and behavior. If consumption likelihood is not yet maximized ("No"), control circuitry 520 loops back to 1102 and repeats 1102-1106 using a different alteration scheme. For example, control circuitry 520 may determine steps from another option are suitable to maximize the consumption likelihood.

If the consumption likelihood is maximized ("Yes"), processing continues to 1108. At 1108, control circuitry 520 determines the optimal content and optimal output characteristics of the voice interaction based on the maximized consumption likelihood. At 1110, control circuitry 520 alters the voice interaction based on the optimal content and output characteristics. For example, if the user is most likely to consume the voice interaction from a smart TV currently presenting a movie, control circuitry 520 may cause the smart TV to output a voice interaction that is appropriately altered. As another example, if the user is expecting an important message from an acquaintance (e.g., Jon), control circuitry 520 may alter a voice interaction related to the important message to include an indication of the acquaintance (e.g., "Jon sent . . . "). At 1112, control circuitry 520 causes output of the altered voice interaction that has a maximized consumption likelihood.

It is contemplated that the various processes as described in relation to FIGS. 7-11 may be used with any other embodiment of this disclosure. In addition, the descriptions in relation to the processes of FIGS. 7-11 may be done in alternative orders or in parallel to further the purposes of this disclosure. For example, conditional statements and logical evaluations may be performed in any order or in parallel or simultaneously to reduce latency or increase the performance (e.g., speed, efficiency, etc.) of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 7-11 may be implemented on a combination of suitably configured software and hardware (e.g., a non-transitory computer-readable medium including instructions for executing steps of the above processes), and that any of the devices or equipment discussed in relation to FIGS. 1-6 could be used to implement one or more portions of the various processes.

The processes described above are intended to be illustrative and not limiting. One skilled in the art would appreciate that the steps of the processes discussed herein may be related causally (i.e., in response), omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing a voice interaction based on user context, the method comprising:
receiving a voice interaction intended for output at a user device during a first output time interval, wherein the voice interaction comprises a first plurality of characteristics corresponding to first audio content, the first output time interval, and first audio signal characteristics;
retrieving current user contextual data of the user device;
identifying, from the current user contextual data, a first factor indicative of high crowd density at the user device;
accessing historical activity data associated with the user device;
determining, based on the historical activity data and the first factor, that activity for the user device is indicative of low user attention when the high crowd density is present for previously outputted voice interactions comprising same characteristics corresponding to one or more of the first audio content, the first output time interval, and the first audio signal characteristics;
identifying, from the historical activity data, activity for the user device indicative of a user attention that is greater than the low user attention when the high crowd density is present for another previously outputted voice interaction comprising a second plurality of characteristics corresponding to second audio content, a second output time interval, and second audio signal characteristics;
generating a first altered voice interaction by altering the first audio content based on the characteristic corresponding to the second audio content of the another previous voice interaction;
determining, based on the historical activity data, a first expected user attention level for the first altered voice interaction;
generating a second altered voice interaction by altering the first output time interval based on the characteristic corresponding to the second output time interval of the another previous voice interaction;
determining, based on the historical activity data, a second expected user attention level for the second altered voice interaction;
generating a third altered voice interaction by altering the first audio signal characteristics based on the characteristics corresponding to the second audio signal characteristics of the another previous voice interaction;

determining, based on the historical activity data, a third expected user attention level for the third altered voice interaction;

comparing the first, second, and third expected user attention levels;

selecting, based on the comparing, an altered voice interaction of the first, second, and third altered voice interactions having expected activity at the user device indicative of a greatest increase to the user attention; and causing to be outputted, at the user device, the selected altered voice interaction.

2. The method of claim 1, wherein generating the second altered voice interaction comprises:

identifying a starting time point of the second output time interval;

determining a duration of the second output time interval; and altering the first output time interval to be delayed to a time point corresponding to the starting time point of the second output time interval and to have a same duration as the duration of the second output time interval.

3. The method of claim 1, wherein generating the third altered voice interaction comprises:

identifying, based on the historical activity data, a portion in background audio at the user device, the portion having a pitch and a frequency corresponding to activity indicative of high user attention; and altering the first audio signal characteristics for the third altered voice interaction based on the pitch and the frequency of the portion in the background audio.

4. The method of claim 1, further comprising:

determining, based on the current user contextual data, that video content is being presented at the user device;

identifying, based on metadata associated with the video content, a time corresponding to a credits scene of the video content; and altering the output time interval of the selected altered voice interaction to be presented at the time corresponding to the credits scene.

5. The method of claim 1, wherein the retrieving the current user contextual data comprises:

capturing, using one or more sensors of the user device, current environment data near the user device.

6. The method of claim 1, wherein generating the first altered voice interaction comprises:

generating text corresponding to the first audio content;

retrieving a user identifier associated with the user device;

identifying one or more keywords in the text of the first audio content;

generating a phrase comprising the user identifier;

altering the text corresponding to the first audio content to add the phrase in the first altered voice interaction; and generating audio output based on the altered text, wherein generating the audio output comprises adding an audio output emphasis to the audio output corresponding to the added phrase in the first altered voice interaction.

7. The method of claim 1, wherein generating the first altered voice interaction comprises altering the first audio content to have a same characteristic of at least one of a language, expression, or style of the second audio content.

8. The method of claim 1, wherein generating the second voice interaction comprises:

determining, based on the historical activity data, that the another previously outputted voice interaction had a maximum output duration in a calm environment; and based at least in part on determining, based on the current user contextual data, that the user device is in an environment corresponding to the calm environment, altering the first output time interval to meet the maximum output duration.

9. The method of claim 1, wherein the user device is a first device, the method further comprising:

identifying a second device for displaying supplemental video content associated with the selected voice interaction; and causing to be displayed at the second device the supplemental video content, wherein the supplemental video content is displayed at the second device concurrently with output of the selected voice interaction at the first device.

10. The method of claim 1, further comprising:

determining, based on the current user contextual data, that a video call is currently active at the user device;

identifying a duration corresponding to a break in the video call; and wherein generating the first altered voice interaction further comprises summarizing the first audio content to meet the duration corresponding to the break in the video call.

11. The method of claim 1, wherein the user device is a first user device, the method further comprising:

identifying, based on the historical activity data, activity corresponding to previous communication from a second user device that indicates high user attention;

determining that the voice interaction is received from the second user device;

retrieving a user identifier associated with the second user device; and wherein generating the first altered voice interaction comprises altering the first audio content to add the user identifier indicating that the voice interaction is received from the second user device.

12. A system for providing a voice interaction based on user context, the system comprising:

communications circuitry configured to receive a voice interaction intended for output at a user device during a first output time interval, wherein the voice interaction comprises a first plurality of characteristics corresponding to first audio content, the first output time interval, and first audio signal characteristics; and control circuitry coupled with the communications circuitry and configured to:

retrieve current user contextual data of the user device;

identify, from the current user contextual data, a first factor indicative of high crowd density at the user device;

access historical activity data associated with the user device;

determine, based on the historical activity data and the first factor, that activity for the user device is indicative of low user attention when the high crowd density is present for previously outputted voice interactions comprising same characteristics corresponding to one or more of the first audio content, the first output time interval, and the first audio signal characteristics;

identify, from the historical activity data, activity for the user device indicative of a user attention that is greater than the low user attention when the high crowd density is present for another previously outputted voice interaction comprising a second plurality of characteristics corresponding to second audio content, a second output time interval, and second audio signal characteristics;

generate a first altered voice interaction by altering the first audio content based on the characteristic corresponding to the second audio content of the another previous voice interaction;

determine, based on the historical activity data, a first expected user attention level for the first altered voice interaction;

generate a second altered voice interaction by altering the first output time interval based on the characteristic corresponding to the second output time interval of the another previous voice interaction;

determine, based on the historical activity data, a second expected user attention level for the second altered voice interaction;

generate a third altered voice interaction by altering the first audio signal characteristics based on the characteristics corresponding to the second audio signal characteristics of the another previous voice interaction;

determine, based on the historical activity data, a third expected user attention level for the third altered voice interaction;

compare the first, second, and third expected user attention levels;

select, based on the comparison, an altered voice interaction of the first, second, and third altered voice interactions having expected activity at the user device indicative of a greatest increase to the user attention; and cause to be outputted, at the user device, the selected altered voice interaction.

13. The system of claim 12, wherein the control circuitry, when generating the second altered voice interaction, is configured to:

identify a starting time point of the second output time interval;

determine a duration of the second output time interval; and alter the first output time interval to be delayed to a time point corresponding to the starting time point of the second output time interval and to have a same duration as the duration of the second output time interval.

14. The system of claim 12, wherein the control circuitry, when generating the third altered voice interaction, is configured to:

identify, based on the historical activity data, a portion in background audio at the user device, the portion having a pitch and a frequency corresponding to activity indicative of high user attention; and alter the first audio signal characteristics for the third altered voice interaction based on the pitch and the frequency of the portion in the background audio.

15. The system of claim 12, wherein the control circuitry is further configured to:

determine, based on the current user contextual data, that video content is being presented at the user device;

identify, based on metadata associated with the video content, a time corresponding to a credits scene of the video content; and alter the output time interval of the selected altered voice interaction to be presented at the time corresponding to the credits scene.

16. The system of claim 12, wherein the control circuitry, when retrieving the current user contextual data, is configured to:

capture, using one or more sensors of the user device, current environment data near the user device.

17. The system of claim 12, wherein the control circuitry, when generating the first altered voice interaction, is configured to:

generate text corresponding to the first audio content;

retrieve a user identifier associated with the user device;

identify one or more keywords in the text of the first audio content;

generate a phrase comprising the user identifier;

alter the text corresponding to the first audio content to add the phrase in the first altered voice interaction; and generate audio output based on the altered text, wherein the control circuitry is configured to add an audio output emphasis to the audio output corresponding to the added phrase in the first altered voice interaction.

18. The system of claim 12, wherein the user device is a first device, and wherein the control circuitry is further configured to:

identify a second device for displaying supplemental video content associated with the selected voice interaction; and cause to be displayed at the second device the supplemental video content, wherein the supplemental video content is displayed at the second device concurrently with output of the selected voice interaction at the first device.

19. The system of claim 12, wherein the control circuitry, when generating the second voice interaction, is configured to:

determine, based on the historical activity data, that the another previously outputted voice interaction had a maximum output duration in a calm environment; and based at least in part on determining, based on the current user contextual data, that the user device is in an environment corresponding to the calm environment, alter the first output time interval to meet the maximum output duration.

20. The system of claim 12, wherein the user device is a first user device, and wherein the control circuitry is further configured to:

identify, based on the historical activity data, activity corresponding to previous communication from a second user device that indicates high user attention;

determine that the voice interaction is received from the second user device;

retrieve a user identifier associated with the second user device; and wherein the control circuitry is configured to alter the first audio content to add the user identifier indicating that the voice interaction is received from the second user device.

* * * * *